US010613521B2

(12) United States Patent
Sandler et al.

(10) Patent No.: US 10,613,521 B2
(45) Date of Patent: Apr. 7, 2020

(54) SCALABLE ANALYTICS ARCHITECTURE FOR AUTOMATION CONTROL SYSTEMS

(71) Applicant: Rockwell Automation Technologies, Inc., Mayfield Heights, OH (US)

(72) Inventors: Scott N. Sandler, Chagrin Falls, OH (US); John Dyck, Chardon, OH (US); Michael J. Pantaleano, Willoughby, OH (US); Edward Alan Hill, Chagrin Falls, OH (US); Ryan Cahalane, Chagrin Falls, OH (US); Nancy L. Burnham, Chagrin Hills, OH (US); Petr Ptacek, Auburn Township, OH (US); Eugene Liberman, Rocky River, OH (US); David W. Comeau, Auburn Township, OH (US); Jonathan Wise, Chardon, OH (US); Michael R. Keller, Menomonee Falls, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 90 days.

(21) Appl. No.: 15/609,301

(22) Filed: May 31, 2017

(65) Prior Publication Data

US 2017/0357249 A1 Dec. 14, 2017

Related U.S. Application Data

(60) Provisional application No. 62/347,789, filed on Jun. 9, 2016.

(51) Int. Cl.
*G05B 19/418* (2006.01)
*G06Q 10/00* (2012.01)

(52) U.S. Cl.
CPC ....... *G05B 19/41835* (2013.01); *G06Q 10/00* (2013.01); *G05B 2219/31151* (2013.01); *G05B 2219/31229* (2013.01); *Y02P 90/86* (2015.11)

(58) Field of Classification Search
CPC ............ G05B 19/4185; G05B 19/4183; G05B 19/4184; G05B 19/4155; G05B 19/41835;
(Continued)

(56) References Cited

U.S. PATENT DOCUMENTS 6,421,571 B1 7/2002 Spriggs et al.
8,031,638 B2 * 10/2011 Ackermann ............ H04L 41/12
370/255
(Continued)

FOREIGN PATENT DOCUMENTS

CN 103217935 A 7/2013
CN 103685442 A 3/2014
(Continued)

OTHER PUBLICATIONS

European Search Report for European Patent Application No. EP17175165.4 dated Aug. 10, 2017, 9 pages.
(Continued)

*Primary Examiner* — Tuan C Dao
(74) *Attorney, Agent, or Firm* — Amin, Turocy & Watson, LLP

(57) ABSTRACT

A layered industrial analytics architecture enables the flow of information from intelligent assets into tools and engines that perform analytics and enable decision-making in substantially real-time. The analytics architecture comprises analytic nodes that are distributed across multiple layers of an industrial enterprise, and includes system features that optimize movement of data across this layered architecture. Each analytic node includes base architectural constructs that host various analytic, data acquisition, and storage elements. These base constructs can operate autonomously, or in conjunction with other instances of base constructs or other elements of the control system. The system design uses a multi-platform compatible implementation that allows the
(Continued)

base elements to be deployed on various different computing platforms.

20 Claims, 20 Drawing Sheets

(58) Field of Classification Search
CPC ............. G05B 19/4189; G06Q 10/063; G06Q 10/063114
See application file for complete search history.

(56) References Cited

U.S. PATENT DOCUMENTS

| | | | |
|---|---|---|---|
| 8,674,993 | B1 | 3/2014 | Fleming et al. |
| 9,329,751 | B2 | 5/2016 | Bardhan |
| 9,645,979 | B2 | 5/2017 | Shinzato |
| 9,760,601 | B2 | 9/2017 | Burke et al. |
| 9,958,860 | B2 | 5/2018 | Rischar et al. |
| 10,048,995 | B1 | 8/2018 | Dikhit et al. |
| 2006/0161597 | A1 | 7/2006 | Ougarov et al. |
| 2007/0094181 | A1 | 4/2007 | Tayebnejab et al. |
| 2008/0114474 | A1 | 5/2008 | Campbell et al. |
| 2009/0228176 | A1 | 9/2009 | Mintah et al. |
| 2010/0292825 | A1 | 11/2010 | Taylor et al. |
| 2012/0078432 | A1* | 3/2012 | Weatherhead ......... G06Q 10/06 700/295 |
| 2013/0124465 | A1* | 5/2013 | Pingel ................... G06F 3/0604 707/610 |
| 2013/0212420 | A1* | 8/2013 | Lawson ............. G05B 19/4185 713/400 |
| 2014/0047107 | A1* | 2/2014 | Maturana ................ H04L 43/04 709/224 |
| 2014/0222522 | A1 | 8/2014 | Chait |
| 2014/0226460 | A1* | 8/2014 | Kretschmann ....... G05B 19/058 370/218 |
| 2014/0335480 | A1 | 11/2014 | Asenjo et al. |
| 2014/0337000 | A1 | 11/2014 | Asenjo et al. |
| 2014/0337429 | A1* | 11/2014 | Asenjo ................. H04L 65/403 709/204 |
| 2015/0120009 | A1 | 4/2015 | Kilian |
| 2015/0277406 | A1 | 10/2015 | Maturana et al. |
| 2015/0281356 | A1 | 10/2015 | Maturana et al. |
| 2015/0316904 | A1 | 11/2015 | Govindaraj et al. |
| 2016/0179599 | A1 | 6/2016 | Deshpande et al. |
| 2016/0299999 | A1 | 10/2016 | James et al. |
| 2017/0351241 | A1 | 12/2017 | Bowers et al. |

FOREIGN PATENT DOCUMENTS

| | | |
|---|---|---|
| EP | 2 592 812 A2 | 5/2013 |
| EP | 2 801 935 A1 | 11/2014 |
| EP | 3 018 596 A1 | 5/2016 |

OTHER PUBLICATIONS

European Search Report for European Patent Application No. EP17175166.2 dated Aug. 14, 2017, 9 pages.
Feddersen, "Real-Time Event Processing with Microsoft Azure Stream Analytics," Reference Architecture, Jan. 2015, 31 pages.
Non-Final Office Action received for U.S. Appl. No. 15/609,323 dated Dec. 31, 2018, 34 pages.
Communication pursuant to Article 94(3) received for EP Application No. 17175165.4 dated Jan. 18, 2019, 8 pages.
Communication pursuant to Article 94(3) received for EP Application No. 17175166.2 dated Dec. 20, 2018, 10 pages.
Non-Final Office Action received for U.S. Appl. No. 15/489,091 dated Feb. 25, 2019, 26 pages.
Final Office Action received for U.S. Appl. No. 15/609,323 dated May 23, 2019, 32 pages.
Notice of Allowance received for U.S. Appl. No. 15/609,323 dated Aug. 12, 2019, 37 pages.
Non-Final Office Action received for U.S. Appl. No. 15/936,870 dated Jul. 10, 2019, 51 pages.
Non-Final Office Action received for U.S. Appl. No. 15/936,940 dated Sep. 9, 2019, 65 pages.
First Office Action received for Chinese Patent Application Serial No. 201710432617.4 dated Jun. 20, 2019, 19 pages (Including English Translation).
First Office Action received for Chinese Patent Application Serial No. 201710433517.3 dated Jun. 21, 2019, 19 pages (Including English Translation).
Final Office Action received for U.S. Appl. No. 15/936,940 dated Jan. 14, 2020, 43 pages.
Summons to attend oral proceedings pursuant to Rule 115(1) EPC received for EP Patent Application Serial No. 17175165.4 dated Nov. 21, 2019, 32 pages.
Wikipedia, "Modularity", URL: https://en.wikipedia.org/w/index.php?title=Modularity&oldid=714646548, Apr. 11, 2016, pp. 1-10.
Wikipedia, "Modular design", URL: https://en.wikipedia.org/w/index.php?title=Modular_design&oldid=721647382, May 23, 2016, pp. 1-4.
Wikipedia, "Modular programming", URL: https://en.wikipedia.org/w/index.php?title=Modular_programming&oldid=723013178, May 31, 2016, pp. 1-5.
Second Office Action received for Chinese Patent Application Serial No. 201710432617.4 dated Jan. 15, 2020, 24 pages (Including English Translation).

* cited by examiner

SCALABLE ANALYTICS ARCHITECTURE FOR AUTOMATION CONTROL SYSTEMS

CROSS-REFERENCE TO RELATED APPLICATIONS

This application claims priority to U.S. Provisional Application Ser. No. 62/347,789, filed on Jun. 9, 2016, and entitled "ANALYTIC NODE FOR SCALABLE ANALYTICS SYSTEM," the entirety of which is incorporated herein by reference.

BACKGROUND

The subject matter disclosed herein relates generally to industrial automation systems, and, more particularly, to systems and methods for analyzing industrial data and generating notifications, reports, visualizations, control outputs, or other results based on such analysis

BRIEF DESCRIPTION

The following presents a simplified summary to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an analytic node for processing industrial data is provided, comprising an analytic component configured to execute one or more analytic elements that perform one or more analytic operations on a set of industrial data; a data manipulation component configured to execute one or more data manipulation elements that at least one of pre-process the set of industrial data prior to performance of the one or more analytic operations or post-process result data generated by the one or more analytic elements as a result of the performance of the one or more analytic operations; a data store component configured to execute one or more data store elements that store at least one of the set of industrial data or the result data at a defined storage location; and an application framework component configured to exchange at least a subset of the industrial data between the one or more analytic elements, the one or more data manipulation elements, and the one or more data store elements, wherein the application framework component is further configured to send at least another subset of the industrial data and the result data to another analytic node device.

Also, one or more embodiments provide a method comprising performing, by an analytic node device comprising at least one processor, one or more pre-processing operations on industrial data to yield pre-processed industrial data, wherein the one or more pre-processing operations are defined by one or more modular data manipulation elements installed on the analytic node device; performing, by the analytic node device, one or more analytic operations on the pre-processed industrial data to yield result data, wherein the one or more analytic operations are defined by one or more modular analytic elements installed on the analytic node device; storing, by the analytic node device, at least one of a subset of the industrial data or the result data at one or more storage locations defined by respective one or more modular data store elements installed on the analytic node device; sending, by the analytic node device, at least one of another subset of the industrial data or the result data to another analytic node device; and exchanging, by the analytic node device, data between the one or more modular data manipulation elements, the one or more modular analytic elements, and the one or more modular data store elements via an application framework that facilitates installation of the one or more modular data manipulation elements, the one or more modular analytic elements, and the one or more modular data store elements.

Also, according to one or more embodiments, a non-transitory computer-readable medium is provided having stored thereon instructions that, in response to execution, cause a system to perform operations, the operations, comprising performing one or more pre-processing operations on industrial data to generate pre-processed industrial data, wherein the one or more pre-processing operations are defined by one or more modular data manipulation elements installed on the analytic node device; performing one or more analytic operations on the pre-processed industrial data to generate result data, wherein the one or more analytic operations are defined by one or more modular analytic elements installed on the analytic node device; storing at least one of a subset of the industrial data or the result data at one or more storage locations defined by respective one or more modular data store elements installed on the analytic node device; sending at least one of another subset of the industrial data or the result data to another analytic node device; and exchanging data between the one or more modular data manipulation elements, the one or more modular analytic elements, and the one or more modular data store elements via an application framework that facilitates installation of the one or more modular data manipulation elements, the one or more modular analytic elements, and the one or more modular data store elements.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
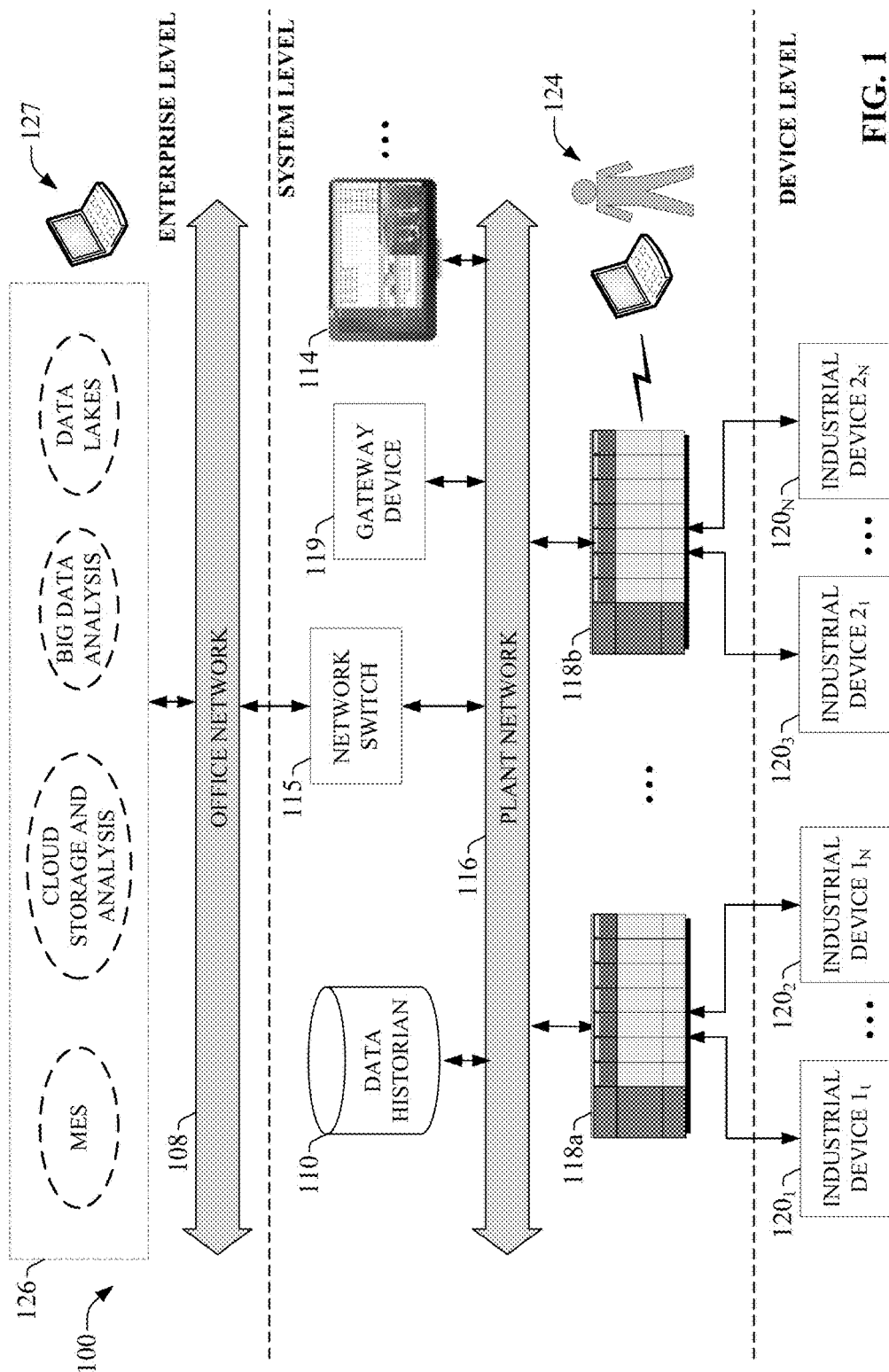
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

Some industrial control systems can include devices that are directly connected to the plant network rather than being connected to and controlled by an industrial controller 118. This connectivity allows for a wider variety of logical control topologies where system and machine level control are no longer limited to industrial controllers. In addition, the movement toward the convergence of the plant and office networks in the Industrial Internet of Things (IIoT) allows for the emergence of capabilities that can be deployed in a variety of hardware and software platforms and may be executed anywhere within the automation control system as well as in higher level supervisory and even cloud based systems. One or more embodiments of the present disclosure provide systems and methods for leveraging scalable computing, hardware and OS platform independence, distributed deployment and multi-node collaboration.

FIG. 1 is a block diagram of an example industrial control environment 100. In this example, a number of industrial controllers 118 as well as automation devices 120 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial devices may also interact with controllers or may perform control system operations independently. One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include input devices that provide data relating to the controlled industrial systems to the industrial controllers 118, output devices that respond to control signals generated by the industrial controllers 118 to control aspects of the industrial systems, and/or smart control devices 120 that may perform some aspect of the control system in conjunction with or independent of the controller. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Smart industrial devices may include motor drives, motor starters, power monitors, remote terminal units (RTUs), and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 or industrial devices 120 over a plant network 116, and exchange data with the industrial controllers or devices to facilitate visualization of information relating to the controlled industrial processes on one or more pre-developed operator interface screens.

HMIs 114 can be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. HMIs 114 can also be configured to interact directly with some industrial devices that allow direct control of the device from the HMI.

Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources. Other systems may include inventory tracking system, work order management systems, repositories for machine or process drawings and documentation, vendor product documentation storage, vendor knowledgebases, internal knowledgebases, work scheduling applications, or other such systems, some or all of which may reside on the plant network 116 or an office network 108 of the industrial environment.

In many network topologies, the connection between the office network 108 and the plant network 116 is managed by a network switch 115. The switch 115 manages routing of information between the office and plant networks. The switch may also enforce policies, including but not limited to security and access policies. In some cases, the network switch may also be used as a computing platform to host other applications used for processing data from the plant network before being passed on to the office network.

In some system applications, a gateway device 119 may be used in addition to the network switch 115 for the purpose of processing and routing data from the plant network to a higher level system 126. The gateway device 119 may also be used as a computing platform to host other applications used for processing data from the plant network before being passed on to the higher level system 126.

Other higher-level systems 126 may carry out functions that are less directly related to control of the industrial automation systems on the plant floor, but rather are directed to long term planning, high-level supervisory control, reporting, or other such functions. These system may reside on the office network 108 or at an external location relative to the plant facility, and may include, but are not limited to, cloud storage and analysis systems, big data analysis systems, manufacturing execution systems, data lakes, reporting systems, etc. In some scenarios, applications running in the higher level system may be used for analysis of control system operational data the results of which may be fed back to an operator at the control system, or may be fed back directly to a controller 118 or device 120 in the control system.

Personnel interested in higher level operations may interact with the higher level system 126 using a variety of business level visualization interfaces 127. These interfaces may include but are not limited to business dashboards, remote monitoring and diagnostic displays, push notifications, chat-based interfaces and other mechanisms. The visualization interfaces may be executed on a variety of platforms including but not limited to desktop computers, tablets, and mobile devices such as smart phones.

The present disclosure is directed to a layered industrial analytics architecture that seeks to simplify the discovery of new insights by enabling the flow of information from intelligent assets into tools and engines that perform analytics and enable decision-making in substantially real-time. To this end, the industrial analytics architecture employs core analytics components that are distributed across multiple defined layers (or levels) of an industrial enterprise, and includes system features that optimize movement of data across this layered architecture. The system utilizes base architectural constructs to host various analytic and data acquisition and storage elements. These base constructs can operate autonomously, or in conjunction with other instances of base constructs or other elements of the control system. The analytic system design uses a multi-platform compatible implementation that allows the base elements to be deployed on various different computing platforms.

In general, the system processes data using analytic nodes (or other analytic elements) on the particular layer of the industrial enterprise (e.g., enterprise level, system level, device level, etc.) at which the analysis results are most relevant to the particular problem being solved. This can reduce response latency of the relevant industrial systems relative to pushing data from those systems to a remote analytic node (e.g., a purely cloud-based analytic system). This solution allows a diversity of analytic solutions to be applied to an industrial automation or control system, where the analytic elements can be scoped to individual devices within the control system, or can participate in a cooperative manner at increasing levels of complexity, aggregation, and abstraction. The analytics system can allow for collaboration of analytic capabilities deployed as autonomous elements within the broader industrial system so that the collaboration results in the aggregate analytic solution can solve increasingly more complex or higher level problems.

The layered analytics system described herein acts as an adjunct of the primary control systems (e.g., control systems such as those described above in connection with FIG. 1), and is modeled as an outer loop. The layered architecture of the analytics system is generally based on the layers (or levels) defined by the Purdue model, with analytics being performed at various levels or layers of the architecture (e.g., enterprise level, system level, device level, etc.). In one or more example embodiments, an analytic node can serve as the building block used to implement the analytic architecture (however, other analytic elements can be used as the basis for the analytic architecture in some embodiments. The analytic node has a plug-in architecture as will be described in more detail herein. Such analytic nodes can be distributed across all layers of the architecture via deployment in industrial devices (e.g., industrial controllers, motor drives, sensors, etc.), in cloud-based analytics systems or architectures, chat-based search interfaces, or other platforms that make up the industrial enterprise. The system is scalable horizontally within a level as well as vertically across levels.

Figure 2:
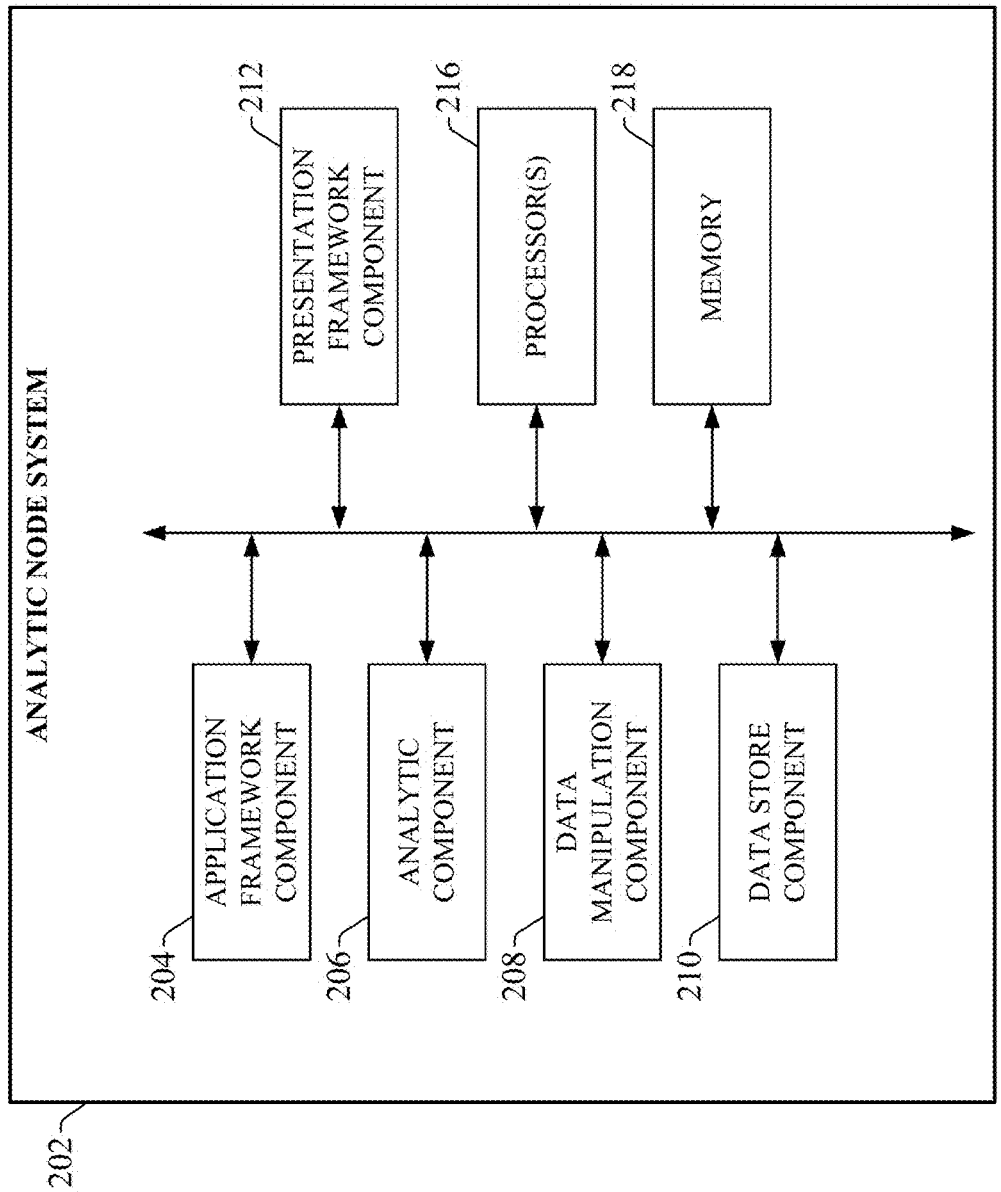
FIG. 2 is a block diagram of an example analytic node system.

FIG. 2 is a block diagram of an example analytic node system 202 (also referred to herein as an "analytic node") according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Analytic node system 202 can include an application framework component 204, an analytic component 206, a data manipulation component 208, a data store component 210, a presentation framework component 212, one or more processors 216, and memory 218. In various embodiments, one or more of the application framework component 204, analytic component 206, data manipulation component 208, data store component 210, presentation framework component 212, the one or more processors 216, and memory 218 can be electrically and/or communicatively coupled to one another to perform one or more of the functions of the analytic node system 202. In some embodiments, components 204, 206, 208, 210, and 212 can comprise software instructions stored on memory 218 and executed by processor(s) 216. Analytics node system 202 may also interact with other hardware and/or software components not depicted in FIG. 2. For example, processor(s) 216 may interact with one or more external user interface devices, such as a keyboard, a mouse, a display monitor, a touchscreen, or other such interface devices.

The application framework component 204 can be configured to interface various modular elements with one another and provide data exchange services for the modular elements. The modular elements can include, but are not limited to, analytic elements executed by the analytic component 206, data manipulation elements executed by the data manipulation component 208, and data store elements executed by the data store component 210. The architecture of the application framework component acts as a base architecture to which selected modular elements can be added or removed to satisfy the requirements of a given analytic application.

Analytic component 206 can be configured to execute one or more analytic elements that perform defined analytic operations on data received from an industrial device, a system-level or business device, or another analytic node system. Data manipulation component 208 can be configured to execute one or more data manipulation components that perform pre-processing of the data prior to processing by the analytic elements executed by the analytic component 206, or post-processing of analytic results generated by the analytic elements. Data store component 210 can be configured to execute one or more data store elements that perform local storage and retrieval of data used by the analytic node system 202.

Presentation framework component 212 can be configured to deliver data associated with the analytic node system 202 to an authorized presentation client having access to the system 202. The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
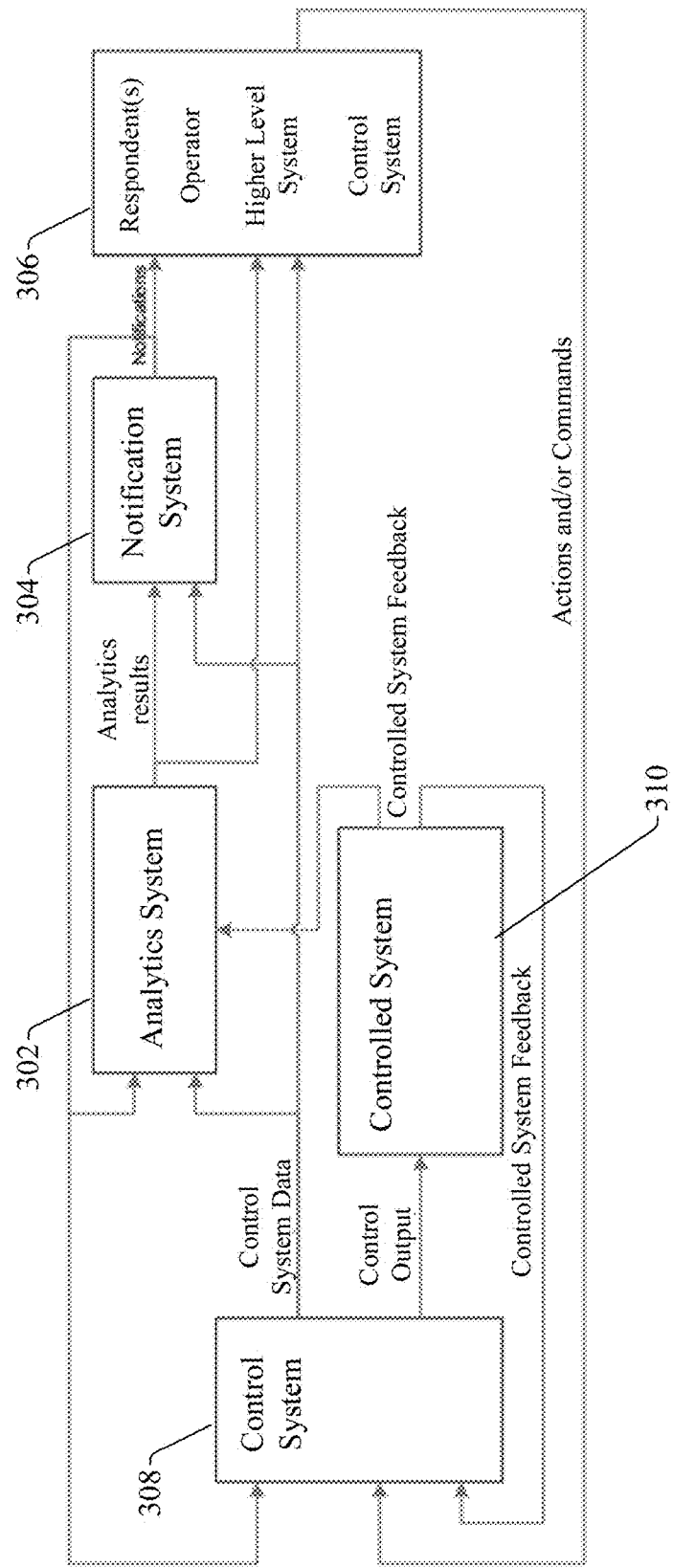
FIG. 3 is a diagram of a high-level, abstract analytics system model illustrating the general relationship between a layered analytics system and an industrial control system.

FIG. 3 is a diagram of a high-level, abstract analytics system model illustrating the general relationship between the layered analytics system and an industrial control system. Control system 308 (e.g., an industrial controller and associated I/O devices, including sensors, motor drives, etc.) controls a controlled system or process 310 (e.g., a machine, a batch process, etc.). The analytics system 302 (which can include one or more analytic node systems 202) is a separate entity relative to the control system 308 but interacts with the control system 308. However, some components of the analytics system 302 can reside within some devices of the control system 308 as embedded elements. For example, an analytics node (e.g., analytic node system 202) can be deployed in a card that fits in a rack of an industrial controller, or as a peripheral device that fits in a motor drive or other industrial device. Both the analytics system 302 and the control system 308 can send notification data (via interaction with a notification system 304) to entities or respondents 306, which can include human operators (e.g., personal client devices associated with human operators, such as laptop computers, tablet computers, mobile personal devices such as smart phones, etc.), higher level systems, or other control systems. Control system 308 can also direct other information—including but not limited to status and operational data—to respondents 306. The analytics system 302 can also direct analytic result data to respondents 306. As an example of real-time manipulation of the control system 308 by the analytics system 302, analytics results generated by the analytics system 302 are fed directly to the control system 308 acting as the respondent, and the control system 308 alters one or more control operations based on the analytics results. In this way, the analytics system 302 acts as a real-time closed loop outer control loop to the primary control system 308 (e.g., to perform higher level supervisory control of the primary control implemented by the control system 308).

Figure 4:
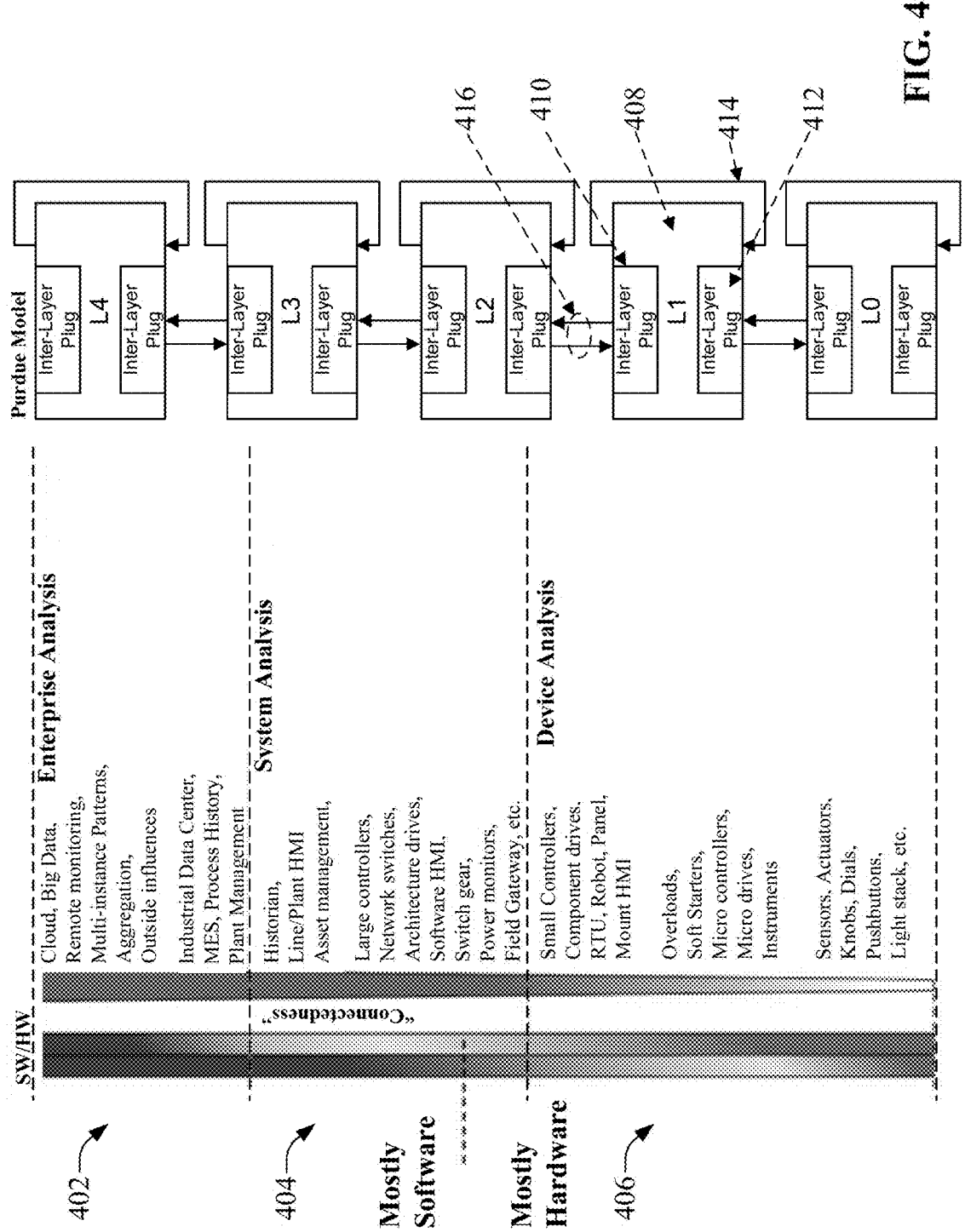
FIG. 4 is a diagram illustrating an abstract high-level model of the layered architecture.

As noted above, the layered industrial analytics system performs analytics at multiple defined levels, which may be based partially on the Purdue model. FIG. 4 is a diagram illustrating an abstract high-level model of the layered architecture. It is to be appreciated, however, that the layers depicted in FIG. 4 are only intended to be exemplary, and that the layered analytics architecture described herein can be based on other defined layers without departing from the scope of this disclosure.

In this example layered architecture, operations of an industrial enterprise are classified hierarchically into an enterprise layer 402, a system layer 404, and a device layer 406. These layers generally demark a hierarchy of control roles and responsibilities among devices and entities that make up the industrial enterprise. In general, a large amount of data is generated at the lower layers, particularly the device layer 406, which encompasses the industrial devices and controllers that facilitate control of industrial automation systems. The scalable analytics system described herein seeks to make better use of the generated data and provides mechanisms for moving the data up and down through the layered architecture for analysis at appropriate layers (e.g., as a function of the scope of an analytics operation, as a function of a time requirement of a result of the analytics operation, etc.). By distributing analytic nodes throughout all the defined layers, the architecture can carry out analysis of data at the layer that is determined to be most appropriate for the particular problem being solved by the analysis.

The device layer 406 can include certain classes of industrial devices (e.g. industrial devices 120 of FIG. 1) that directly measure and manipulate an industrial automation system or process. At a high level, such devices can include small controllers, component drives, remote terminal units (RTUs), industrial robots, HMIs mounted on control panels associated with the industrial systems, and other such devices. Mid-level devices within the device layer can include overloads, soft starters, microcontrollers, micro drives, and instruments. Low-level devices within this layer can include sensors; actuators; panel instruments such as knobs, dials, and pushbuttons; light stacks, and other such devices. In the illustrated example, the collection of devices that make up the device layer 406 can generally correspond to those of levels L0 and L1 of the Purdue model.

This layered architecture can be viewed as a logical representation of the control hierarchy. Some or all of the physical components that make up the control system can be physically connected to a single communication network (e.g., an Ethernet network). Embodiments of the systems described herein do not depend on a particular physical or logical construction of the control systems.

In an example of device-level analytics, an analytic node associated with a photo sensor can determine that the photo sensor's lens is dirty based on an analysis of data generated by the sensor (e.g., the analytic node may track received signal strength data generated by the sensor, and determine based on an attenuation of this signal strength data over time that the lens has accumulated a sufficient amount of dirt to merit sensor cleaning). In response, the analytic node (to be described in more detail herein) can log an event, and send a notification directed to a maintenance technician indicating that the sensor should be cleaned. In another example of device-level analytics, a motor drive may receive vibration and temperature information from sensors embedded in a motor. This information—combined with current, voltage and velocity feedback data from the drive—may be fed into a device-level analytic node which is then able to predict motor bearing failures and send an alert to a maintenance technician before the failure occurs. In general, device-level analytics can leverage data relating to a single industrial device or a collection of related devices, and generate analytic results relevant to that device. The device-level analytic results can be consumed at the device (e.g., by triggering an automated action or countermeasure within the device), output to a client device associated with a respondent (e.g., maintenance personnel or engineers), or sent to another analytic node on the same level or on another level for further processing.

The system layer 404 can include devices or systems that perform higher-level supervision and control of the industrial automation system or process, often through interaction with the devices deployed on the device layer 406. Such system-level devices can include, but are not limited to, large controllers (e.g., PLCs), network switches, architecture drives, software HMIs, switch gear, power monitors, field gateways, etc. The system layer 404 can also include devices or systems that carry out auxiliary functions relating to the controlled industrial systems or processes, such as data historians that collect and archive data generated in connection with monitoring and controlling the industrial automation system, line or plant HMIs, asset management systems, etc. The system-level devices can generally correspond to those of layers L2 and L3 of the Purdue model in this example. A sub-division of the system level 404 includes a machine-level operation where the scope of context is limited to a sub-element of a larger system. Examples of machine-level elements can include, but are not limited to, pumps, fans, chillers, or other such machine elements.

In an example of machine-level analytics that can be carried out by the analytics architecture described herein, an analytic node deployed on the device layer can monitor flow meters on intake and outflow pipes of a pump, as well as drive current of a motor drive that runs the pump. The analytic node can execute an analytic engine that can determine, based on analysis of this monitored data, that there is an air bubble in the pipe. In response to this determination, the analytic node can command the drive to slow down to prevent the bubble from reaching the pump. In general, machine-level analytics are scoped to an industrial machine that is being monitored and controlled by a collection of industrial devices. Machine-level analytic nodes can perform analysis on data collected from the collection of industrial devices associated with the machine, and generate analytic results that are scoped to the machine. As in the case of device-level analytics, results of the analytic nodes can be consumed at the machine level (e.g., by instructing the industrial devices to alter operation of the machine), sent to a respondent, or sent to another analytic node on the same level or on a different level for further processing.

In an example of system-level analytics that can be carried out by the analytics architecture disclosed herein, a data historian may monitor multiple data tags of an industrial controller, and a system-level analytics engine or node can determine, based on the monitoring, that a machine component will require maintenance or replacement within a certain time frame. For example, the analytics node can determine that slitter knives of a cutting machine will need replacement within four days (e.g., based on a determination that a trend of improper cuts has exceeded a threshold, a determination that a frequency of rejected parts has exceeded a threshold, etc.). The analytics node can then display a message on a panel HMI indicating that the slitter knives are worn. The analytics node can also send a notification to a client device associated with a maintenance manager instructing the manager to schedule a replacement of the slitter blades.

The enterprise layer 402 can include systems that reside at a highest level of an industrial enterprise and that perform functions having a scope that encompasses the entire industrial facility or group of facilities that make up the industrial enterprise. These can include cloud-level storage and/or analytics systems, big data analysis systems, multi-instance pattern or workflow systems, multi-system data aggregation systems, systems that correlate extrinsic data with industrial process data, industrial data centers, manufacturing execution systems (MES), process history systems, plant management systems, etc. Enterprise layer systems can generally correspond to those of level L4 of the Purdue model in this example.

In an example of enterprise-level analytics that can be carried out by the analytics architecture described herein, machine operational data can be sent to a cloud-based analytics system via a field gateway device (e.g., field gateway device 119). An analytic node running on the cloud platform can monitor machine operational data from multiple industrial sites worldwide, and can also monitor weather and power grid conditions. Based on this monitoring, the analytic node can send optimized production schedule data to operations managers at each plant facility in order to optimize overall production worldwide. In general, the scope of enterprise-level analytics can encompass multiple facilities or industrial systems.

The collection of analytic nodes at each layer can be considered a layer-specific analytic subsystem 408, where each analytic subsystem 408 includes interlayer plugs 410 and 412 for passing data between layer-specific subsystems. Each analytic subsystem 408 defines and controls what data analytics and/or action can or should be done within the context of the subsystem's layer. In general, the analytics system will perform as much of the data analytics as is determined to be appropriate at the lowest levels, and will migrate data and/or analytic results to higher layers for higher-level analysis when deemed necessary. This layered approach offers an improvement over analytics systems that perform all analytics and generate all actions at a centralized analytics system (e.g., on a cloud platform), since system response time can be improved when analysis and corresponding instruction initiation are carried out on the layer at which the instructions will be consumed. For example, this layered approach can reduce the need to send data generated at the device level to a remote analytics system, and to await receipt of an action instruction from this remote system.

With reference to the abstract model of FIG. 4, the closed loop 414 associated with a given analytic subsystem 408 represents data that is both discovered and acted upon within the current layer. The up-direction interlayer plug 410 can filter, aggregate, and add contextual information to data at the current layer that is intended for use by the next higher layer, and send this data (together with any added contextualization information) up to the next layer. The down-direction interlayer plug 412 represents commands, events, etc. that are expected to have a response in the current layer or a lower layer, and can send this data to the next lower layer. Data is passed between layer-specific analytic subsystems 408 via interlayer pipes 416, which comprise methods, interfaces, networks, and/or data structures for passing data.

Since the defined layers of the analytics system are hierarchical, the scope of analytics carried out at the respective layers will typically broaden as data is moved to higher layers. For example, the scope of data processed at a device layer may only encompass a particular automation system within a given facility; that is, the data that is processed by the device-layer analytic subsystem originates only from that automation system, and actions prescribed by the device-layer analytic subsystem will only affect that automation system. System-layer analytics may encompass data from several automation systems within a plant. For example, data may be pushed to the system layer subsystem from several different device layer subsystems associated with respective different automation systems. The system-level analytic subsystem may aggregate or merge this data for collective analysis and action. Likewise, enterprise-layer analytics may encompass data not only from multiple automation systems, but also data from multiple different geographically diverse facilities, allowing a high-level strategic analysis to be carried out by analytic nodes on that layer. Also, as analysis is moved upward in the layered architecture, correlation of the industrial data with extrinsic data may become more relevant. For example, an enterprise-layer analytic subsystem may correlate industrial data received from several facilities (e.g., from analytic node devices associated with those facilities) with such extrinsic data as weather information, financial market data plant/line/machine production data, manufacturer product data, power grid data, buying pattern data, medical record data, etc. The extrinsic data can be obtained by the analytic node from one or more external data sources (e.g., web-based data sources).

By prioritizing data analytics at lower layers before passing data to higher layers when analytics at a higher layer is considered appropriate, the layered analytics system can provide immediate analytic value at a given layer without requiring additional solution elements outside the current layer. This approach can also reduce data throughput requirements of the communication infrastructure, since not all data will be sent to a higher level, centralized analytics system. This approach also reduces memory and computational requirements at higher layers of the architecture.

Figure 5:
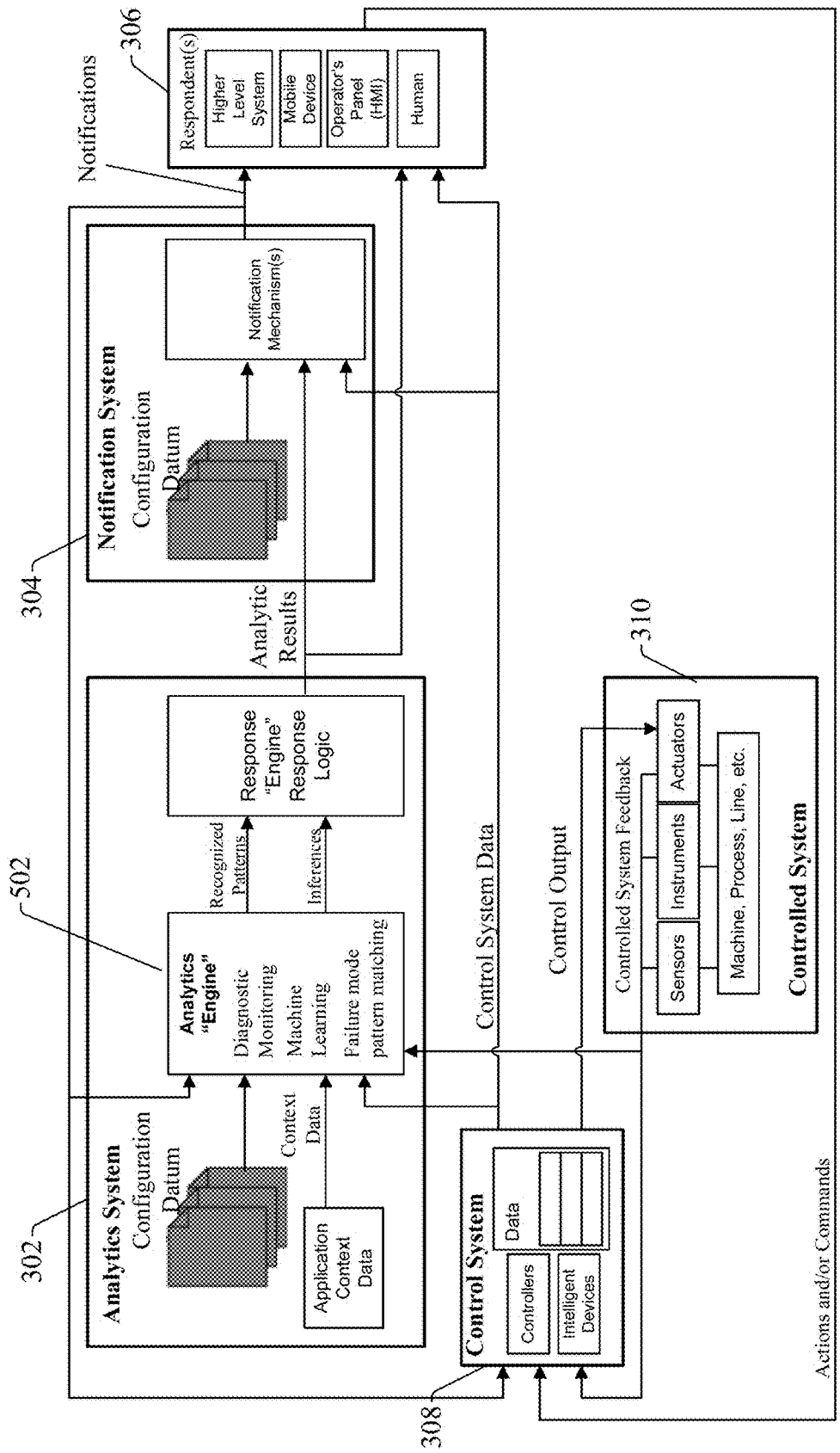
FIG. 5 is a diagram illustrating more detail of the high-level, abstract analytics system model depicted in FIG. 3.

FIG. 5 is a diagram illustrating more detail of the high-level, abstract analytics system model depicted in FIG. 3. Controlled system or process 310 comprises the machine, process, line, or other system that is being controlled by control system 308. To this end, controllers and/or other intelligent devices of the control system 308 receive system feedback data from sensors, instruments, actuators, etc. that collect information from the controlled machine or process, and send control outputs to the actuators or other output devices to facilitate control of the machine or process. The control system 308 maintains various types of data, including but not limited to configuration data (e.g., PLC programming, drive configuration settings, etc.), event data, diagnostic and state data, etc. Control system 308 can also send control system data (e.g., visualization data, notifications, etc.) to various respondents 306, which may include higher level systems, mobile devices, panel-mounted HMIs, human operators, etc. Some of this control system data may be sent to the respondent(s) 306 via notification system 304, which uses one or more notification mechanisms to deliver notification data to an HMI, a user's mobile device, or other such client device. Such notifications can be delivered in accordance with notification configuration data, which can define such parameters as preferred recipients for various types of notifications, contact information for such recipients, notification delivery preferences, etc.

Analytics system 302 can include an analytics engine 502—made up of one or more analytic elements, to be described in more detail herein—that defines the analytics logic or algorithms for processing data collected from the devices associated with control system 308 and controlled system 310. Example algorithms executed by the analytics engine 502 can include, for example, diagnostics monitoring, machine learning, failure mode pattern matching, or other such analytics. Diagnostics monitoring algorithms can monitor one or more identified data items indicative of a performance metric of a machine or process and identify when the metric deviates from an acceptable range. Machine learning algorithms can monitor one or more specified data items over time and learn patterns of machine or process activity. Some such machine learning algorithms can, based on these learned patterns, output predictive trend information for the machine or process, modify one or more machine or process operating parameters based on a prediction of future performance (e.g., modifying an operating parameter in a manner determined to mitigate a future deviation from a desired performance metric), or perform another suitable action based on results of the machine learning. Failure mode pattern matching algorithms can monitor values of one or more data items over time and detect the presence of a known pattern indicative of a machine or process failure. In response to identifying a failure mode pattern, such algorithms may output a notification to a client device, modify one or more machine or process parameters in a manner determined to mitigate the failure, or perform another suitable action. The analytics engine 502 can be programmed and configured by configuration data provided by an administrator or other user. Some data analytics carried out by analytics engine 502 can also be dependent on context data associated with an application installed on the analytics system 302.

Figure 6:
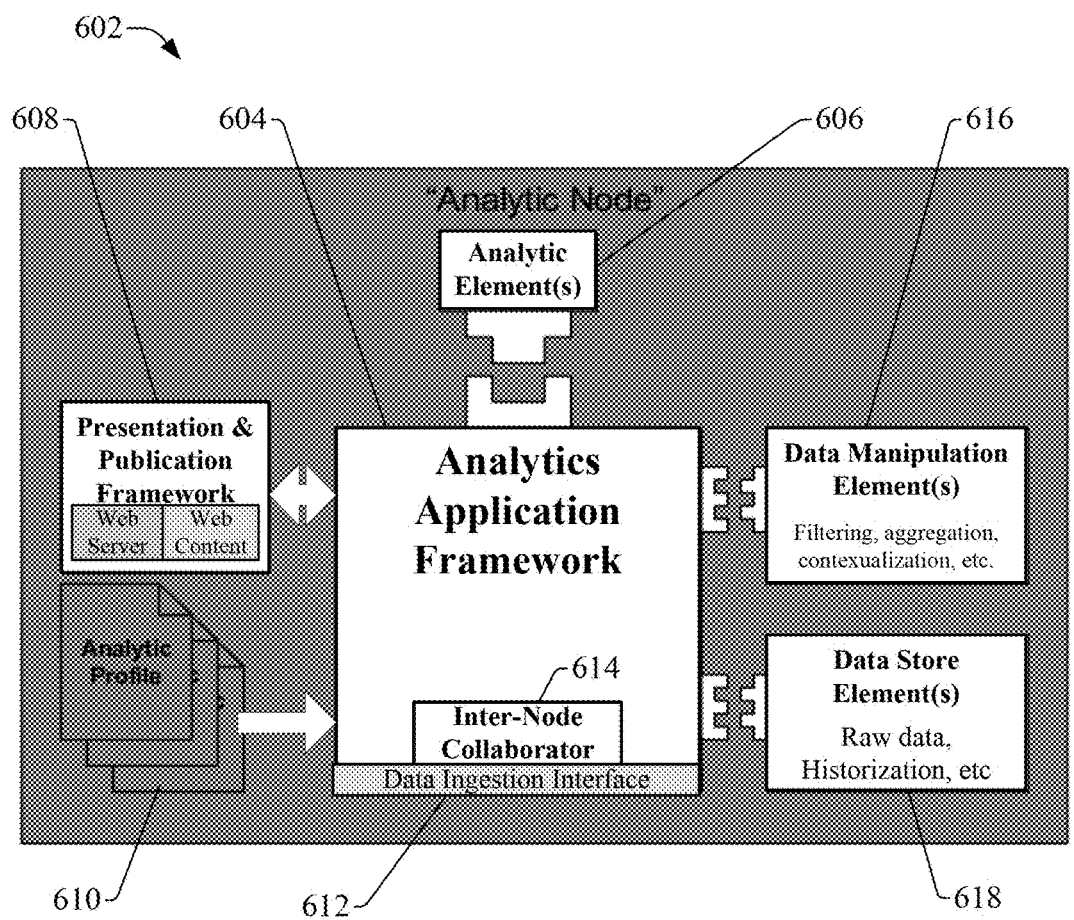
FIG. 6 is a diagram illustrating functional elements of an example analytic node.

Although the scalable, layered analytics system described herein can be built using any suitable type of analytic element as the building block, example systems described herein use analytic nodes as the base analytic element. For example, the analytics engine 502 can be implemented on each layer by one or more analytic nodes. FIG. 6 is a diagram illustrating functional elements of an example analytic node 602. As the means for implementing analytics system 302, analytic node 602 can be used as a core building block of the layered analysis architecture described herein. The modular nature of the functional elements that make up analytic node 602 give the node an internal extensible framework. The analytic node 602 includes mechanisms for interfacing with its host platform to collect data and issue commands, and for collaborating with other nodes on data analysis. The node 602 can be implemented using platform-independent technology, allowing the node to run on multiple different execution platforms. Analytic node 602 can be implemented as hardware, a combination of hardware and software (e.g., executable components stored on a hardware memory and executed by a processor or other computational device), software, or software in execution The core of the analytic node 602 is an application framework 604 (implemented by analytic framework component 204), which provides a mechanism that allows various other modular functional elements to be integrated into (or "plugged" into) the analytic node 602. Once functional elements (to be described in more detail below) have been added to the application framework 604, data exchange functions supported by the application framework 604 transport data between the functional elements. In this way, application framework 604 serves as an interface or bus between the modular elements. The application framework 604 also transports data to and from ingress and egress layers that send data to or receive data from other analytic nodes or client devices. The application framework 604 provides a bus-like construct that allows the various functional elements of the analytic node 602 to interact with each other.

Analytic element(s) 606 are the functional components that perform the analytic operations. These analytic elements 606—which can be implemented and executed by analytic component 206—can each define analytic rules using simple rules-based elements, or may define complex algorithms. Although only one analytic element 606 is depicted in FIG. 6, the application framework 604 can be configured to allow multiple analytic elements 606—each defining different analytic rules or operations—to be plugged into or integrated with the node 602. Example analytic functions that can be carried out by analytic elements 606 include, but are not limited to, simple limit checks, rule-based analysis, mathematical algorithms, machine learning engine analysis, expert or artificial intelligence (AI) capability, etc. Analytics element 606 can operate on live streaming data received by the analytic node 602 from one or more industrial devices (e.g., via the node's ingress layer) or on stored historical data retrieved by the node 602. Analytic node 602 can produce output data as a result of its analysis on the streaming or stored industrial data.

Data manipulation element(s) 616—which can be implemented and executed by data manipulation component 208—can perform pre- or post-processing of data used in the analytic system. Example pre- or post-processing that can be carried out by the data manipulation element 616 can include, but is not limited to, filtering, aggregation, addition of contextual information to the data, or other such processing. Contextual information that can be added to raw data by the data manipulation element 616 can include, but is not limited to, a time at which the data was generated or received by the analytic node 602; a quality indicator; an identity of a plant or a production area within a plant from which the data was received; a machine or process state at the time the data was generated; personnel identifiers that identify plant employees on shift at the time the data was generated, or other such contextual information. Data manipulation element 616 describes how input and output data is to be manipulated by the node 602 either prior to consumption by an analytic element 606 or after output from an analytic element 606.

Data store element(s) 618—which can be implemented and executed by data store component 210—can support local storage and retrieval of data used by the analytic node 602. For example, the data store element 618 can be configured to store data on local storage, either as input to or output from an analytic element 606. The data store element 618 can store the data on a designated storage area of the host hardware platform on which the node 602 executes. Data store element 618 may also control or set a pointer to an external data store, such as a large volume historian, containing data to be processed by the analytic element 606. The analytic element 606 can reference this pointer to determine a retrieval location from which to retrieve a data item to be processed.

Presentation and publication framework 608—which can be implemented and executed by presentation framework component 212—can be an adjunct to the core functionality of the analytic node 602, and provides a standard interface between the node 602 and a presentation layer (e.g., a mobile client device, a web server, etc.). The presentation and publication framework 608 can include two main functional aspects—the interface that the framework 608 communicates with that is exposed by the analytic node framework, and the actual presentation engine that includes layers of a model-view-viewmodel (MVVM) design pattern. Analytic nodes may be deployed either with or without a presentation and publication framework 608. For example, if it is known that a particular analytic node 602 associated with an industrial device on the device layer will not need to directly provide visualization information to a user's client device or HMI, that analytic node 602 can be deployed without a presentation and publication framework 608.

Analytic profile 610 can define how data is to be collected and handled by the analytic node 602. For example, analytic profile 610 can identify the data items that are to be acquired from the control system (e.g., control system 308) by the analytic node 602, as well as what data is to be transported to other functional elements of the analytic node 602, including defining which of the analytic elements 606 the data is to be routed to for processing. Analytic profile 610 also defines where the output results of processing performed by the analytic elements 606 are to be transmitted (e.g., either another analytic element 606 of the analytic node 602, another analytic node 602 at a higher or lower layer relative to the current layer, or another external entity outside of the current analytic node 602). The analytic profile 610 can also identify which data items are to be transported to external recipients, where the external recipients may be identified by the analytic profile 610 as a human operator (whereby the analytic profile 610 defines contact information for the human operator that can be used to send the data to the operator), another system (e.g., an ERP or MES system, an inventory system, an accounting system, etc.), or other such external recipients. In terms of identification of data items, the analytic profile 610 can support definition of data from a variety of sources, including but not limited to industrial devices (e.g., industrial controllers, motor drives, HMI terminals, vision systems or other quality check systems, industrial robots, etc.), software applications, and other analytic nodes (either within the same layer or from another layer of the architecture). Analytic profiles 610 can be scoped to a particular device, system, or application, or to substantially any context that is appropriate for the analytic element that will be consuming the identified data items, and the specific application to which the analytic node 602 is being applied.

Inter-node collaborator 614 provides a mechanism for the analytic node 602 to exchange data and interact with other analytic nodes for the purposes of data exchange and collective analysis. Using this functionality, multiple analytic nodes 602 interacting with one another can form a collective "super node" that exhibits an aggregate functionality as well as unique functionality among the nodes.

Data ingestion interface 612 provides a mechanism for the analytic node 602 to be hosted by different computing platforms, and to pass data between the node's internal framework and external entities. External entities may include other analytic nodes or other entities of a control system.

As a building block for the multi-layered analytical architecture, analytic node 602 renders the architecture scalable within and across layers. For example, within a given layer new analytic nodes 602 can be added to accommodate newly installed automation systems or industrial processes, and these new analytic nodes 602 can be easily integrated into the analytic system. Also, additional analytic elements 606 can be added to the analytic node's application framework 604 in order to expand the functionality of a given node, allowing each analytic node to be easily updated to accommodate desired additional analytics. Each node contains its own presentation layer (presentation and publication framework 608) capable of sending data, analysis results, or notifications to client devices or HMI terminals for rendering to a user. For example, the presentation and publication framework 608 can be configured to send data or analytic results to thin clients executing on the client devices via a public or semi-public network such as the internet or a cloud platform.

Figure 7:
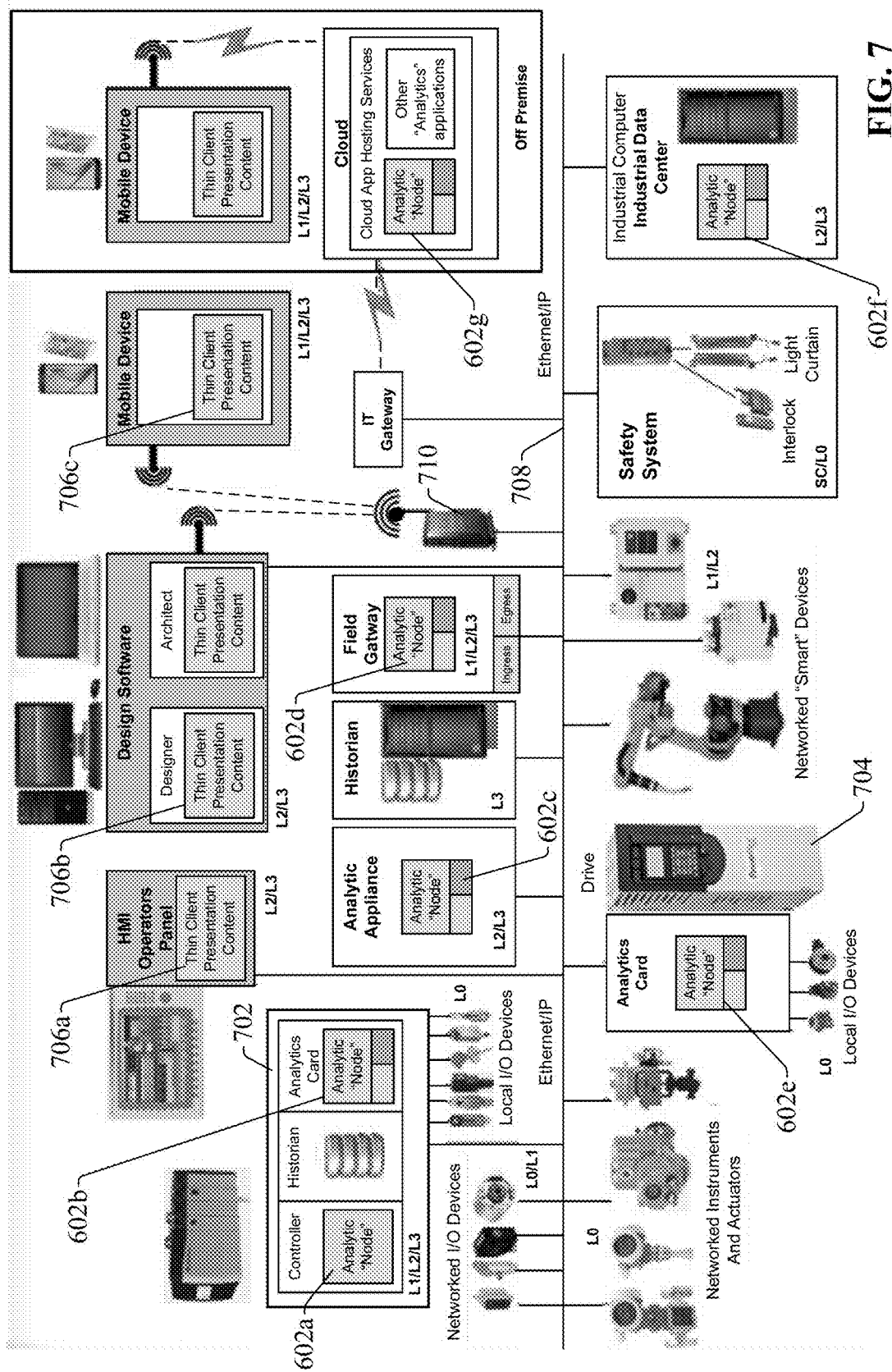
FIG. 7 is a diagram illustrating an example deployment of analytic nodes throughout a given industrial enterprise.

To build the layered analytic framework, analytic nodes 602 can be deployed on multiple platforms and devices throughout the industrial enterprise. FIG. 7 is a diagram illustrating an example deployment of analytic nodes 602 throughout a given industrial enterprise. As shown in FIG. 7, analytic nodes can be deployed on a number of different types of devices and platforms. At the device layer (corresponding to layers L0 and L1 of the Purdue model), one or more analytic nodes can execute on device-level industrial devices, such as motor drive 704. In the illustrated example, analytic node 602e executes on an analytics card mounted in, otherwise associated with, the drive 704. At the system layer (corresponding to layers L2 and L3 of the Purdue model), one or more analytic nodes 602 can execute on an industrial controller 702, either as a component of the main controller (as with node 602a), or embodied as an analytics card that mounts in the industrial controller's I/O module rack (as with node 602b). Such analytic nodes can receive and process data generated by the controller 702 (or received by the controller from local or networked I/O devices) and stored on the controller's data table. Results of this processing by the analytic nodes can be consumed by the controller 702 itself (e.g., used to modify a set point or other parameter defined by the controller's program) or sent to another analytic node for further processing if the result satisfies a defined criterion.

Analytic nodes can also execute on dedicated analytic appliances (node 602c) or on field gateway devices (node 602d). At the enterprise level (corresponding to layer L4 of the Purdue model), analytic node 602g executes off-premise on a cloud platform as a cloud service, while analytic node 602f executes as a component of an industrial data center. Each of these analytic nodes 602 can process data generated by, received by, or stored on their respective host devices, and can also process data received from other analytic nodes, either separately or collectively with local data. Nodes 602 can also be installed on other types of devices, including but not limited to remote I/O modules, analog and digital sensors, industrial robots, safety devices such as light curtains or safety controllers, quality systems (e.g., vision systems), or other such devices.

In the example architecture depicted in FIG. 7, a number of the industrial devices are communicatively connected via a physical network 708 (e.g., Ethernet/IP). This network can serve as the interlayer pipes 416 (see FIG. 4) via which the analytic nodes 602 exchange data. Some analytic nodes 602 may also be configured to communicate via wireless connectivity.

The presentation and publication frameworks 608 of the respective analytic nodes 602 can deliver data associated with their respective analytics to any authorized presentation client 706 having access to the architecture. These can include, for example, thin clients that execute on HMIs (e.g., presentation client 706a), on industrial control program development applications (e.g., presentation client 706b), on mobile personal devices (e.g., presentation client 706c), or other suitable platforms for rendering notifications or analytic report data. Presentation frameworks 608 can send their respective data or analytic results to the presentation clients 706 over the physical network 708 or via a wireless connection (e.g., via one or more wireless routers 710).

Analytic nodes 602 can be deployed on the hardware and software platforms described above even after the control system devices are operational, since the analytic nodes 602 can be installed on existing industrial devices without the need to replace the devices.

Figure 8:
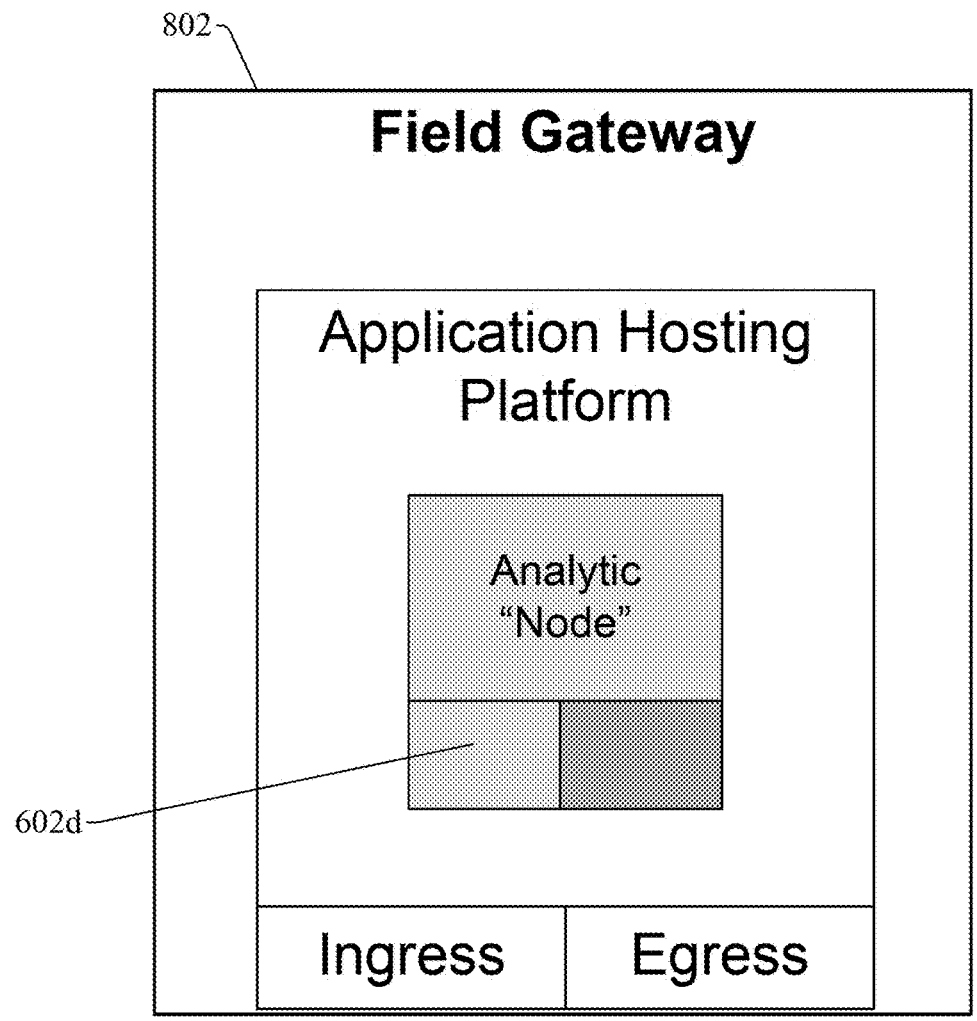
FIG. 8 is a diagram of an example analytic node installed on a field gateway device.

FIG. 8 is a diagram of an example analytic node 602d installed on a field gateway device 802. Field gateway device 802 can be configured to collect data from one or more industrial systems and send the collected data to an external system or cloud platform for storage or analysis. As illustrated in FIG. 8 (as well as FIG. 7), an analytic node 602d can be installed in or connected to the field gateway device 802. The analytic node 602 can be configured to perform analysis on one or more items of data that are collected by the field gateway device and migrated to the external system. The analytic process performed on the data can be defined by the one or more modular analytic elements 606 that are associated with the node 602d (e.g., diagnostics monitoring, machine learning, failure mode pattern matching, simple or complex algorithms, etc.). In some implementations, node 602d can leverage portions of the memory and processing capability of the host device (in this case, the field gateway device 802) in order carry out the analytics on the data. Alternatively, the node 602d can comprise a self-contained node that interfaces with the field gateway device 802 in order to exchange data therewith, but uses its own native storage and processing resources to execute analytics on the data.

Depending on the type of analytic application, results of the processing performed by the analytic node 602 can be stored locally on the field gateway device 802, sent to the external system to which the gateway device 802 is connected, sent to a client device via a notification system (e.g., notification system 304) or other communication channel, sent to another analytic node for further processing, or used to modify one or more gateway parameters. The decision by the analytic node 602d to send analytic result (or a selected subset of the data collected by the field gateway device 802) to another analytic node can be based on a determination of whether the result or the subset of the collected data satisfy a criterion defined by the node's analytic profile 610. The criterion may be indicative of an importance of the result (or the collected data) to another portion or layer of the overall enterprise architecture. For example, if the analysis result is determined to satisfy a defined criterion indicative of a relevance of the result to a work order management system on a system-layer of the enterprise, the analytic node 602d will send the result data and any other relevant data to an analytic node associated with the work order management system or the system-layer on which the work order management system resides.

Figure 9:
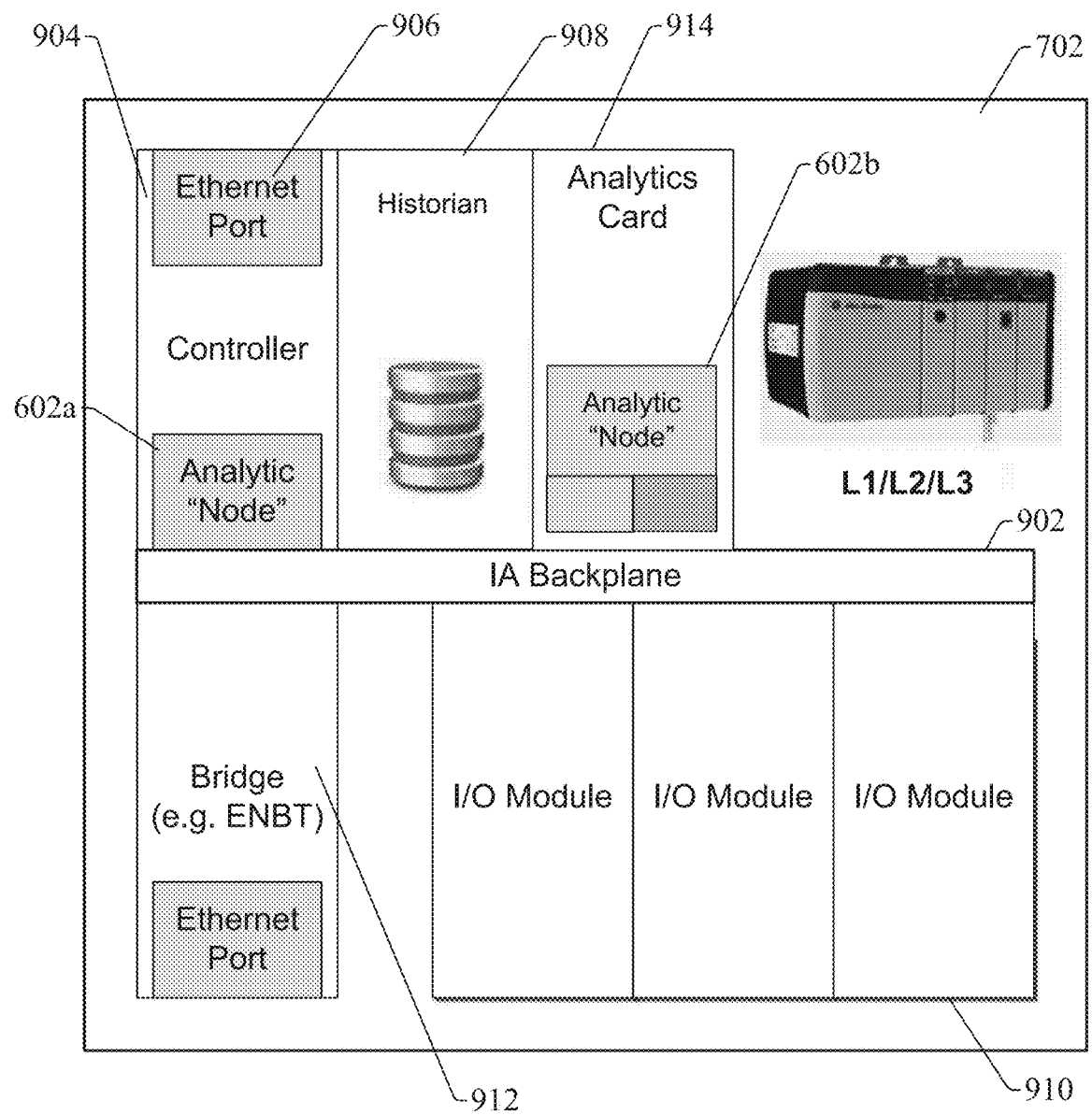
FIG. 9 is a diagram of an industrial controller with analytic nodes installed thereon.

FIG. 9 is a diagram of industrial controller 702 with analytic nodes 602a and 602b installed thereon. In this example, industrial controller comprises a backplane 902 on which is installed a controller module 904 with an integrated Ethernet port 906. Also installed on the backplane 902 are a number of I/O modules 910 for receiving data from or sending output signals to various I/O devices that interface with the controlled industrial automation system or process. I/O modules 910 can include any combination of analog input modules, analog output modules, digital input modules, and digital output modules, as well as any desired special function modules. The controller 702 also includes a network bridge module 912 for connecting to a plant network, and a historian module 808 for collection of data.

In this example, analytic node 602a is installed on the controller module 904 for processing of data stored on the controller's data table, which can include I/O data read from or written to the I/O modules 910, any calculated values generated by the industrial control program executed by the controller module 904, configuration data for the industrial controller, or other such data. Alternatively or in addition, an analytics card 914 can be installed on backplane 902, and can have installed thereon another analytic node 602b for processing of local controller data (as well as any data received from other analytic nodes on other devices and platforms. Both nodes 602a and 602b are also capable of sending at least a portion of the local controller data (or analytic result data resulting from local processing of the data) to other analytic nodes in the architecture, both within the same layer or on another layer of the architecture, for further processing in accordance with the analytic profiles 610 associated with the nodes. The analytics processing carried out by either of nodes 602a and 602b is separate from the control program processing carried out by the controller 904 in connection with monitoring and controlling an associated machine or process.

Figure 10:
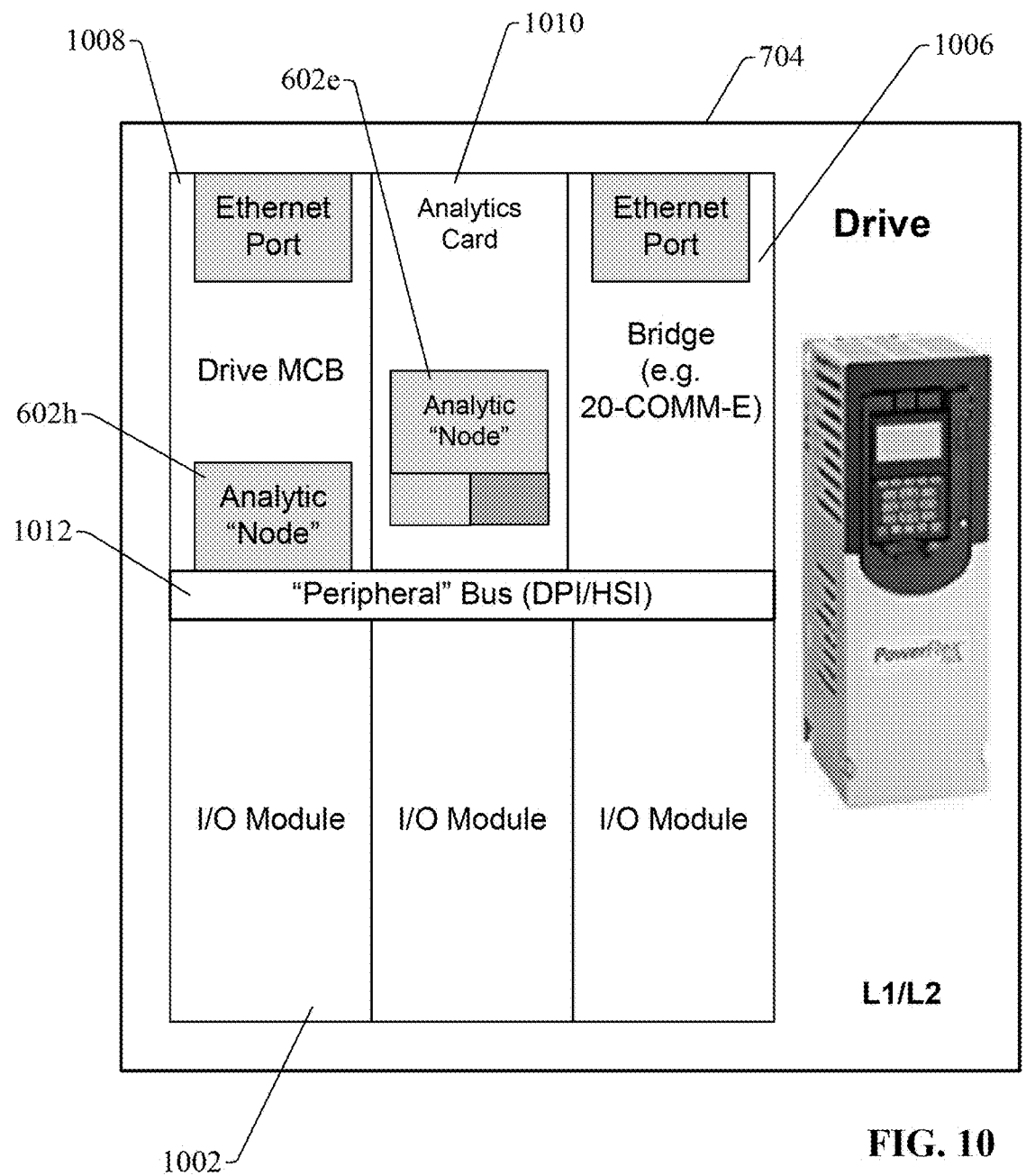
FIG. 10 is a diagram of a motor drive with analytic nodes installed thereon.

FIG. 10 is a diagram of motor drive 704 with analytic nodes 602e and 602h installed thereon. Motor drive 704 may be, for example, a variable frequency drive or other type of drive. Motor drive 704 includes a drive motor control board (MCB) 1008, a network bridge 1006 and one or more I/O modules 1002, which are communicatively connected via a peripheral bus 1012. The drive 704 also includes an analytics card 1010—also connected to the peripheral bus 1012—on which analytic node 602e executes. Additionally or alternatively, an analytic node 602h can be installed on the drive's MCB 1008. Both nodes 602e and 602h are capable of processing data generated by the drive 704 (e.g., status and operational information about the motor being controlled by the drive 1004, configuration data for the drive, etc.), as well as data received from other analytic nodes 602. The nodes 602e and 602h can also send data or analytic results to other analytic nodes on the same layer or other layers of the architecture, as described above.

Figure 11:
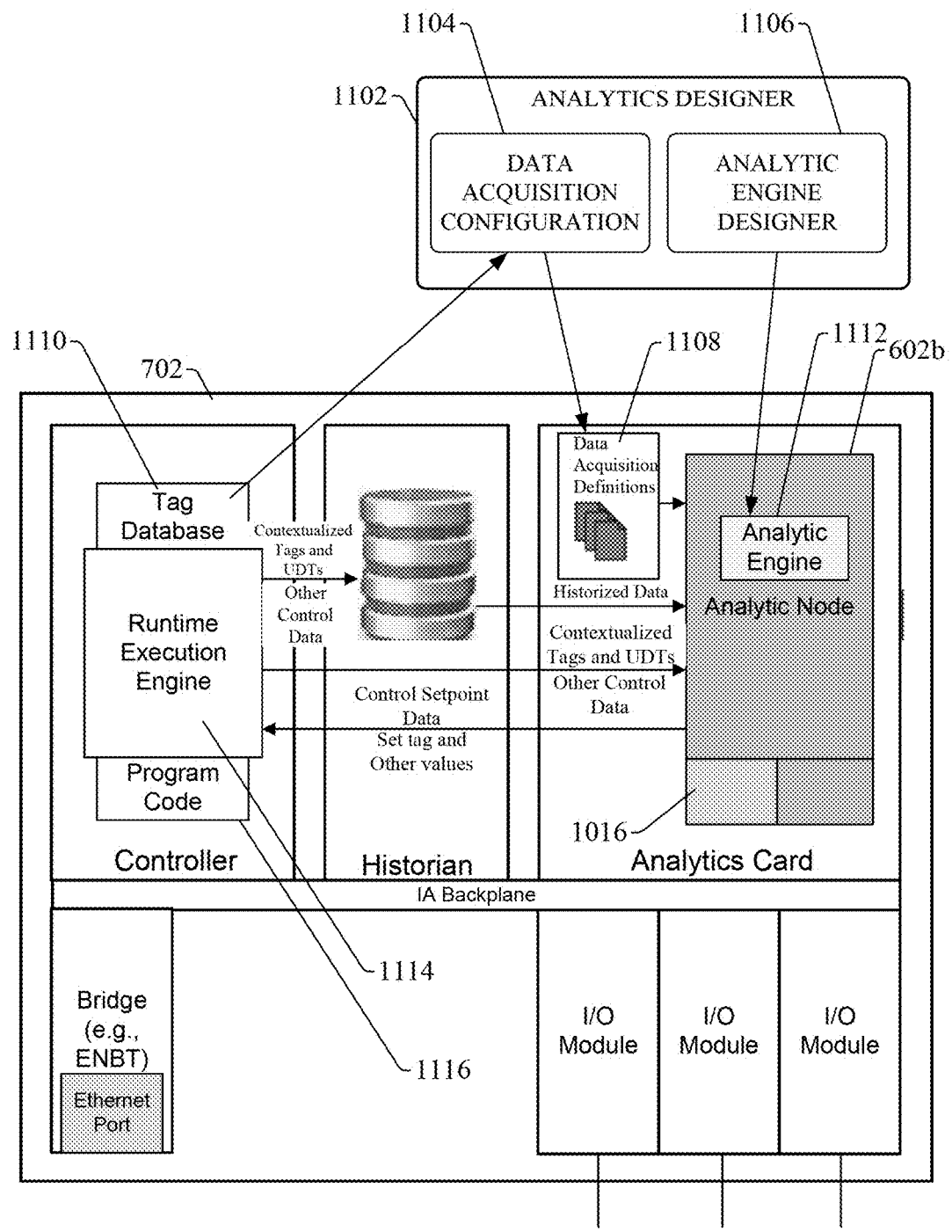
FIG. 11 is a diagram of an industrial controller illustrating configuration of an analytic node and data exchange between the node and the controller data.

FIG. 11 is a diagram of controller 702 illustrating configuration of analytic node 602b to read and process data from selected data tags defined on the controller 702. Analytic node 602b can be configured using an analytics designer application 1102, which can execute on any suitable client device (e.g., a desktop computer, laptop computer, tablet computer, etc.). The analytics designer application 1102 can interface with controller 702 via a network connection or a local connection between the controller 702 and the client device on which the designer is installed.

Analytics designer application can include a data acquisition configuration tool 1104 and an analytic engine designer tool 1106. Data acquisition configuration tool 1104 can be used to configure data acquisition definitions 1108 for the analytic node 602b. The data acquisition definitions 1108, which are part of the analytic profile 610, define the data items that are to be collected and processed by the node 602b. To facilitate simple and intuitive configuration, one or more embodiments of the data acquisition configuration tool 1104 can read and identify available data items from the controller's tag database 1110 and present these available data items to the user via the analytic designer's interface, allowing the user to select which of the available data items are to be associated with the analytic node 602b via interaction with the interface (e.g., browsing and selecting from a displayed list of the available data items).

The designer application 1102 also includes an analytic engine designer tool 1106 that allows the user to define the analytic engine 1112 that will process the local controller data. This can involve, for example, associating one or more predefined analytic elements 606 with the node's application framework 604, or creating a user-defined analytic element 606 for associated with the node's application framework 604. For example, the analytic engine designer tool 1106 may present a set of available predefined analytic elements 606 that define respective analytic functions that can be applied to one or more of the data items selected using the data acquisition configuration tool 1104. The predefined analytic elements 606 can support substantially any type of general or industry-specific analytic function, including but not limited to simple limit checks, mathematical algorithms, rule-based analysis, machine learning engines, an artificial intelligence function, etc. In some embodiments, the analytic engine designer tool 1106 can organize predefined analytic elements 606 according to categories, including industry-specific categories. For example, the analytic engine designer tool 1106 may organize available analytic elements 606 according to the elements' applicability to the automotive industry, the power industry, the food and drug industry, the oil and gas industry, the wastewater treatment industry, or other such industries.

The analytic engine designer tool 1106 can also allow the user to define criteria for moving data (or analysis results) to other nodes on higher or lower layers of the system architecture. Criteria for migrating data or analysis results to a next higher or lower layer can be defined in terms of specific data items (e.g., by specifying data items or analysis results that are always to be moved upward to an analytic node on a higher layer), or in terms of specific contexts, conditions, or analytic results. For example, the user may specify that selected data items are to be moved to a higher-level analytic node if it is determined that a particular machine is in an abnormal state or other defined state. In another example, the user may specify that, if a data value or an analytic result generated by one of the node's analytic elements satisfies a criterion, the analytic result and/or one or more selected data items are to be sent to a higher-lever analytic node for further processing by the higher-level node's analytic element(s). The criterion may be indicative of a relevance of the data item or analytic result to devices or systems at the higher layer, or a defined scope of responsibility for a given analytic result. The user's defined migration criteria can be stored in association with the node 602 as part of the node's analytic profile 610.

Figure 12:
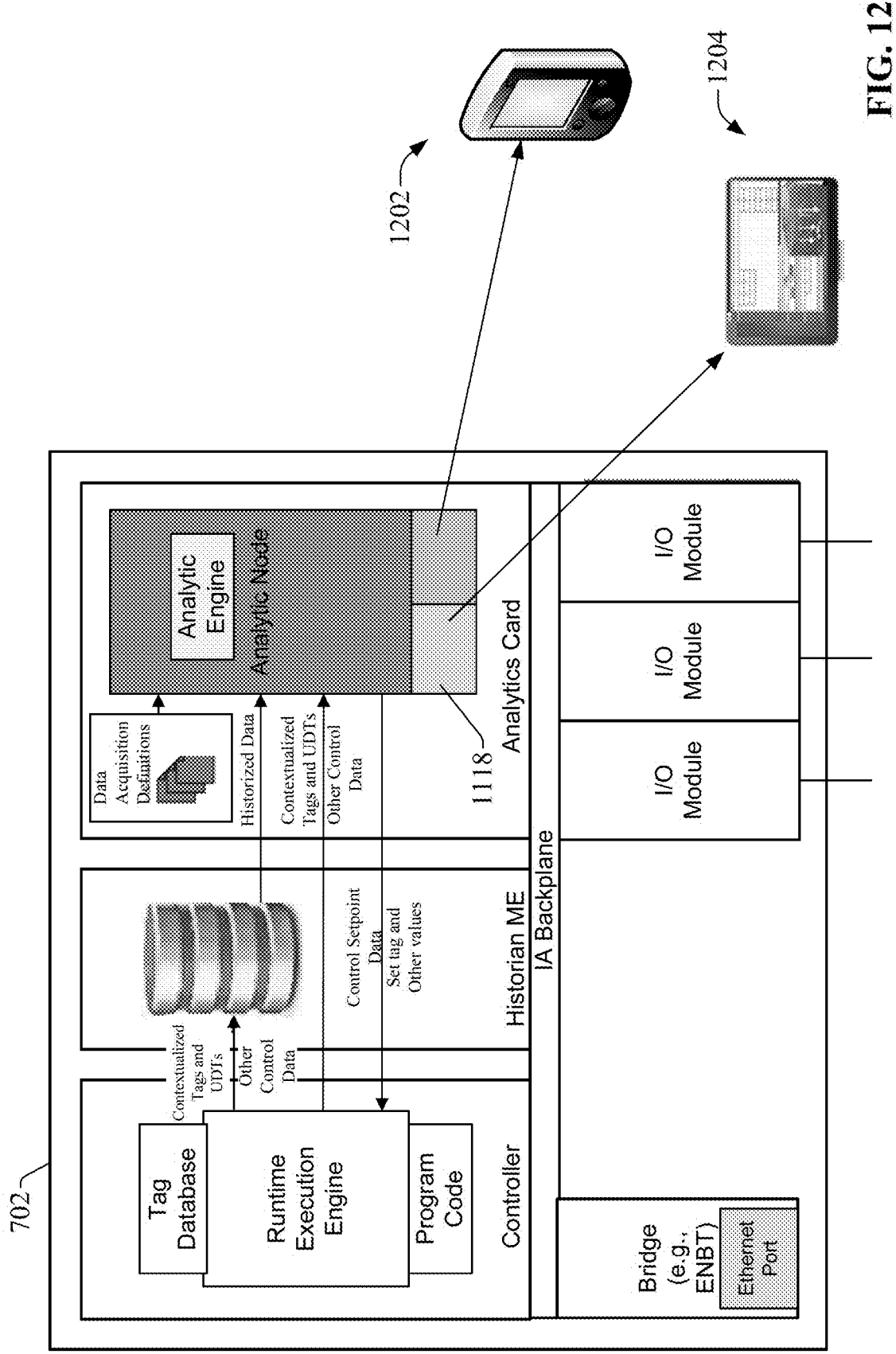
FIG. 12 is a diagram of an industrial controller illustrating presentation of data generated by an analytic node on various client devices.

During operation, the configured node 602b will identify the data items specified by the data acquisition definitions 1108, and retrieve values of the specified data items from the controller's data table or runtime execution engine 1114, which executes the industrial program code 1116 installed on the controller. If the controller 702 includes a historian module, the analytic node 602b can also receive data items from the historian storage. The analytic node 602b can also write values or commands to the controller's execution engine 1114 in accordance with analysis results generated by the analytic node 602b. For example, the node 602b may change setpoint values used by the controller's program code 1116 to regulate an aspect of a controlled machine or process, or may change values of other data tags used by the program code 1116. Also, as shown in FIG. 12, the node's presentation layer elements 1118 can send data, analysis results, or notifications to client devices 1202 or HMI terminals 1204 for rendering to a user; e.g. via thin clients executing on the client devices. As noted above, the presentation layer elements 1118 can send this data to the client devices 1202 over a physical or wireless network, or via a public or semi-public network such as the Internet or a cloud platform.

Figure 13:
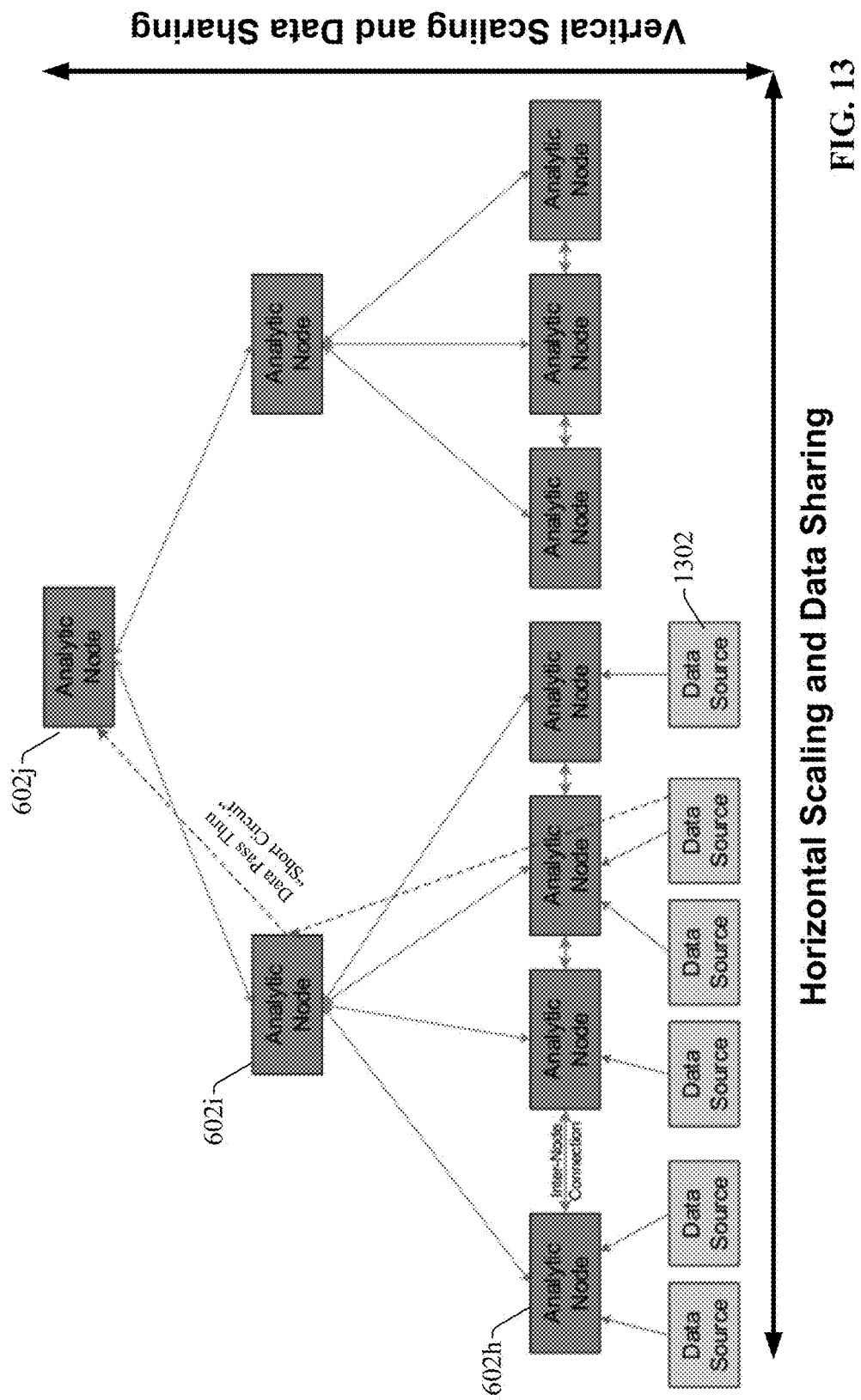
FIG. 13 is a diagram illustrating how analytic nodes yield a scalable industrial analytics architecture having inter-node scalability.

FIG. 13 is a diagram illustrating how the analytic nodes 602 yield a scalable industrial analytics architecture having inter-node scalability. Inter-node scalability relates to collaboration between analytic nodes 602, and how analytics capability is scaled within a particular layer or across layers. This type of scalability allows the user to add capacity to the analytics architecture (e.g., computing power, memory, network bandwidth, etc.). Collaboration between the nodes 602 allows multiple nodes to interact with each other within the same level or between different levels in order to share information and possibly act as an analytical "super-agent." Also, collaboration between nodes 602 allows one node to act as a presenter or publisher for another node that lacks the capability or connectivity to present its own information.

This inter-node collaboration functionality of the analytic node framework allows multiple analytic nodes to be deployed on a variety of execution platforms to interact with each other in a coordinated fashion in order to solve an analytics problem that could not otherwise be solved by any single analytic node. This allows the analytic nodes 602 to work in conjunction with each other either within the same layer of the layered architecture or with higher level analytic nodes or other system entities. As illustrated in FIG. 13, a number of analytic nodes 602h can be deployed at a lowest level of an industrial enterprise (e.g., a device layer), and these nodes can collect and process data from a variety of data sources 1302 (e.g., industrial devices, automation systems, etc.) on the plant floor. The low-level nodes 602h can pass data among each other via inter-node connections. If higher-level processing (e.g., system-level processing) is required, the low-level nodes 602h can pass any relevant data to mid-level nodes 602i, which carry out this processing. As described above in connection with FIG. 11, the criteria for identifying when data is to be sent to a higher-level node can be configured using the analytic engine designer tool 1106. The lower-level nodes 602j can be configured to pre-process these data items prior to sending to the higher-level nodes 602i. This can include, for example, filtering, aggregating, or contextualizing the data (e.g., adding contextual metadata to the data items). Similarly, mid-level nodes 602i can pass selected data items to a highest-level analytic node 602j (e.g., an enterprise layer node) for high-level processing. Horizontal scalability can be achieved by adding or removing nodes and associated inter-node connections within a given layer, while vertical scalability can be achieved by adding or removing nodes and associated connections between layers (which may include adding new layers). Also, some higher-level nodes may be configured to retrieve some data items directly from data sources 1302 for processing rather than relying on the lower level nodes to provide these data items (as represented by the data pass thru "short circuit" path). Such data will be received at the higher nodes unprocessed by the lower nodes.

Each analytic node 602 can operate autonomously or in conjunction with other nodes. Nodes operating in conjunction with each other can provide aggregate or coordinated analytic capabilities. Analytic nodes at higher levels in the architecture can perform analytic operations using filtered, aggregated, or resultant data from lower levels of the architecture.

Figure 14:
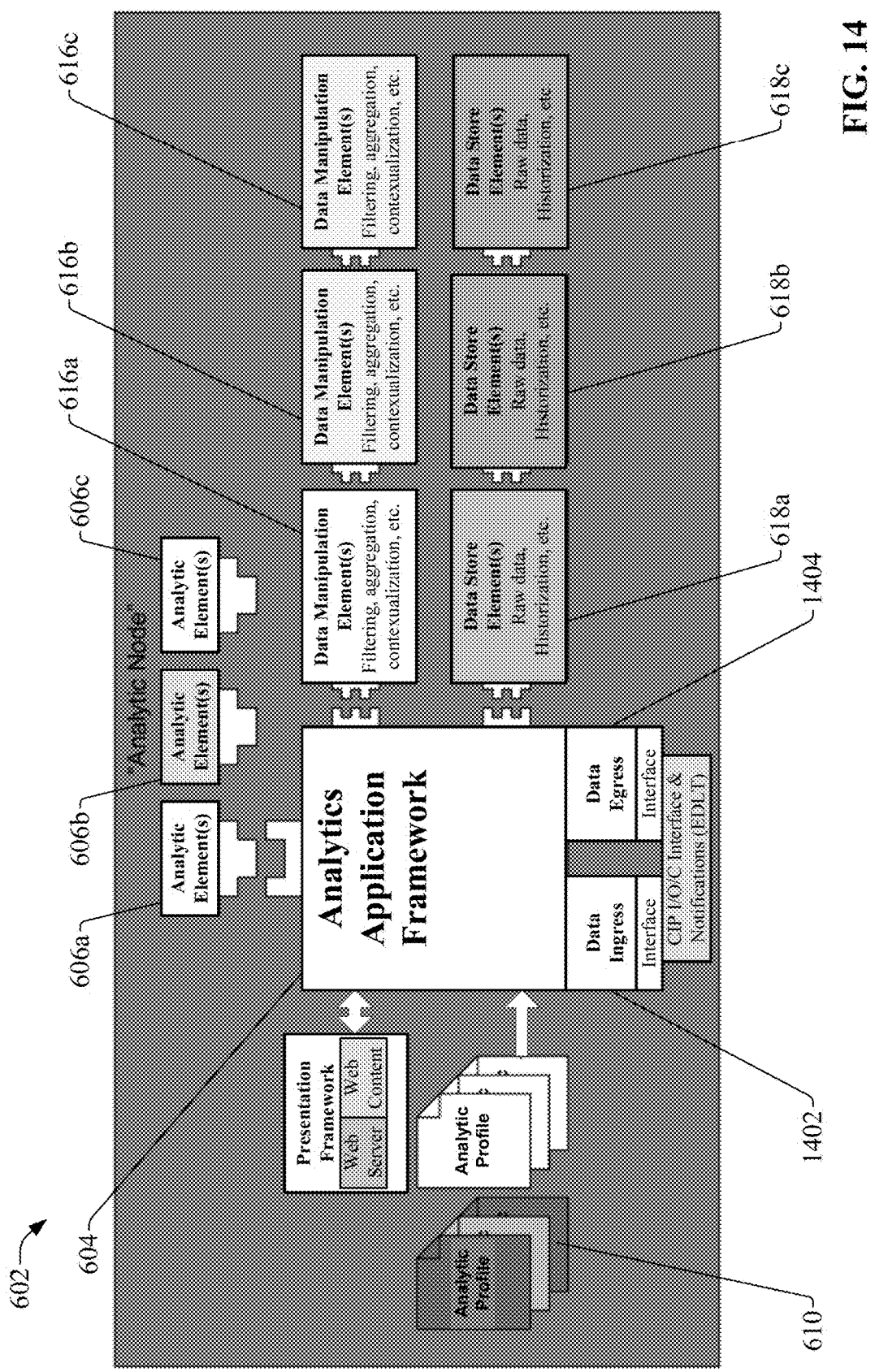
FIG. 14 is a diagram of an analytic node illustrating intra-node scalability.

In addition to the inter-node scalability described above, the modular nature of the functional components that make up the analytic nodes 602 also yields a degree of intra-node scalability, or scaling within the analytic node. FIG. 14 is a diagram of an analytic node 602 illustrating this intra-node scalability. As noted above, the analytic application framework 604 supports "plug-in" addition of functional elements, and can support addition of multiple functional elements of varying types. In the example depicted in FIG. 14, node 602 has been configured to include multiple data manipulation elements 616 representing respective different types of data manipulation to be performed on the data. For example, one data manipulation element 616 may be configured to filter the data according to a defined filtering criterion, another data manipulation element 616 may be configured to aggregate selected data items, while yet another data manipulation element 616 may be configured to add one or more items of contextual information to selected items of data. Analytic node 602 has also been configured to include multiple data store elements 618 that define respective different data storage areas on which to store various data types, as well as multiple analytic elements 606 representing different analysis rules or algorithms Analytic node 602 has also been configured to include multiple analytic profiles 610. In this way, scaling within the node 602 can be achieved by executing multiple instances of the same or different elements.

As illustrated, multiple instances of each of the major elements of the system can be added to the application framework 604. For example, an analytic node 602 could include a simple rule-based analytic element 606 and a machine learning engine analytic element 606, both executing on the analytic node 602 simultaneously. Also, a given analytic node 602 can include functional elements (e.g., analytic elements 606, data manipulation elements 616, data store elements 618, etc.) provided by multiple different vendors or companies.

Data ingress layer 1402 and data egress layer 1404—which are part of the inter-node collaborator 614—are configured to receive data from and send data to other analytic nodes or client devices.

This internal extensibility model allows the analytic node 602 to be configured to perform multiple tasks on multiple different data sets, where a different data manipulation and storage strategy can be configured for each of the different storage sets by virtue of the different analytic elements 606, data manipulation elements 616, and data store elements 618 selected for use within the analytic node 602. In this regard, different analytic profiles 610 can be configured for each of the different data sets to be processed by the analytic node 602, where each analytic profile 610 defines a particular data set (e.g., by identifying a subset of available data items on the host platform on which the node executes) as well as the particular analytic element, data manipulation element, and data store element to be used to process, manipulate, and store the data set. The amount of intra-node extensibility is limited only by the capabilities of the computing platform on which the node 602 executes.

Figure 15:
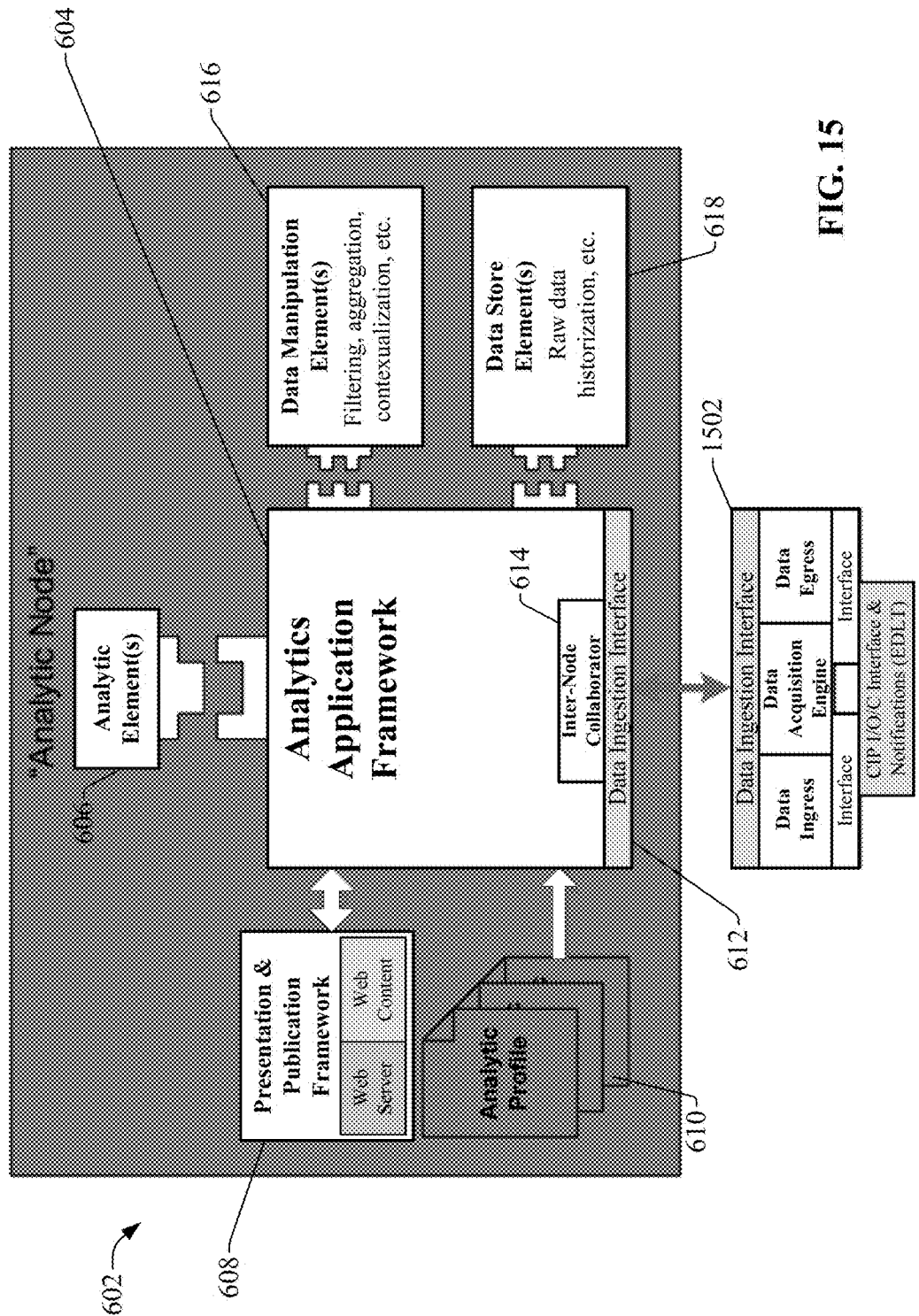
FIG. 15 is a diagram of an analytic node illustrating the analytic node's interface to a hosting platform.

As noted above in connection with FIG. 6, the analytic node framework includes a data ingestion interface 612 that allows the node 602 to be hosted on a variety of execution platforms. FIG. 15 is a diagram of an analytic node 602 illustrating the analytic node's interface to a hosting platform or device. In this example, the hosting platform includes a data interface layer 1502 that allows the analytic node 602 to produce and consume data from an external system that is accessible through the hosting platform. As noted above, example hosting platforms can include, but are not limited to, a dedicated computer; an industrial device such as an industrial controller, a motor drive, a sensor, a telemetry device, an industrial safety device, etc.; a cloud-based analytics system; an MES system; an analytic appliance; a field gateway device; an analytics card installed in an industrial device (e.g., an industrial controller or motor drive); or other such platforms.

Figure 16:
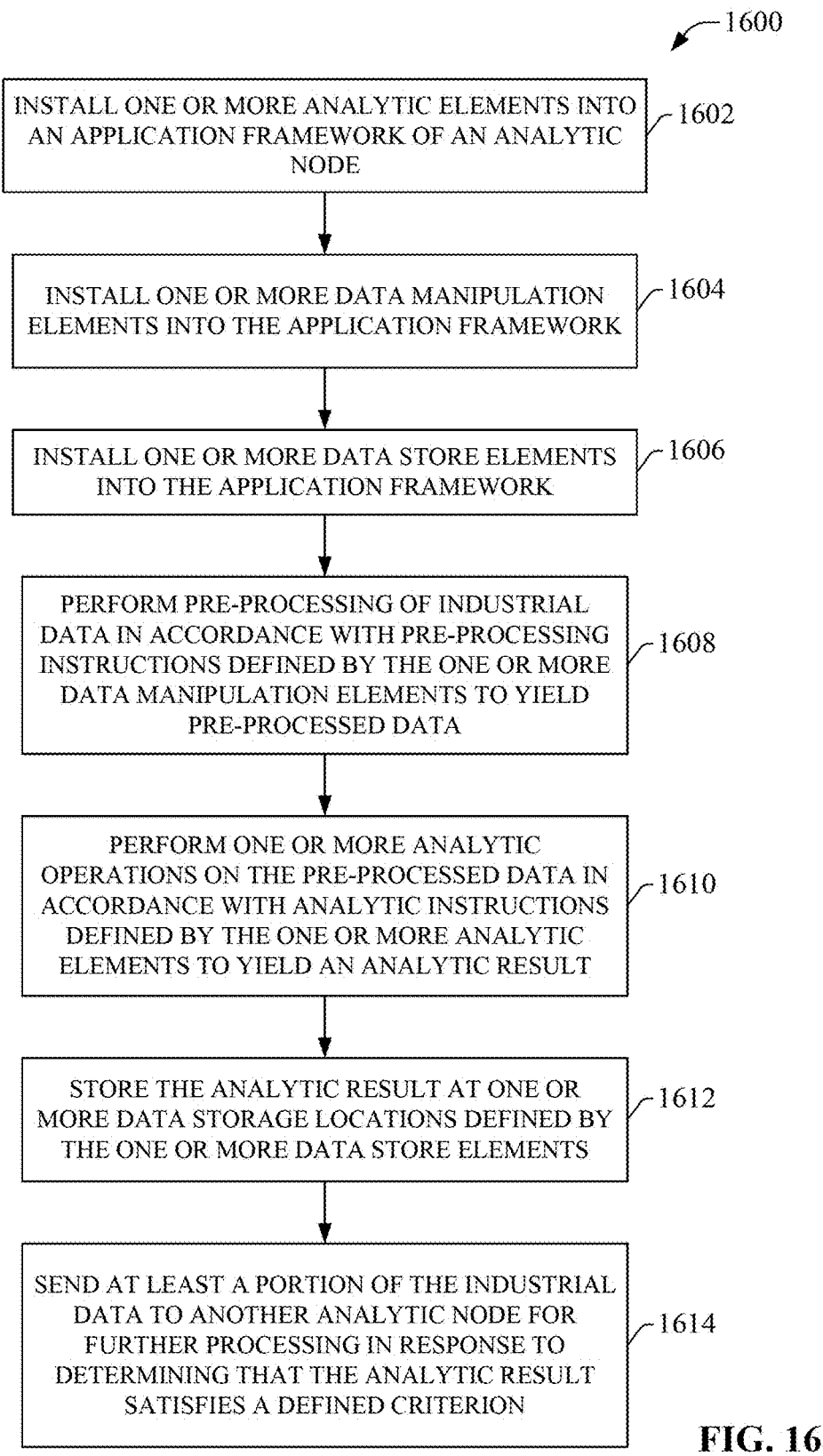
FIG. 16 is a flowchart of an example methodology for configuring an analytic node for processing of industrial data.
Figure 17A:
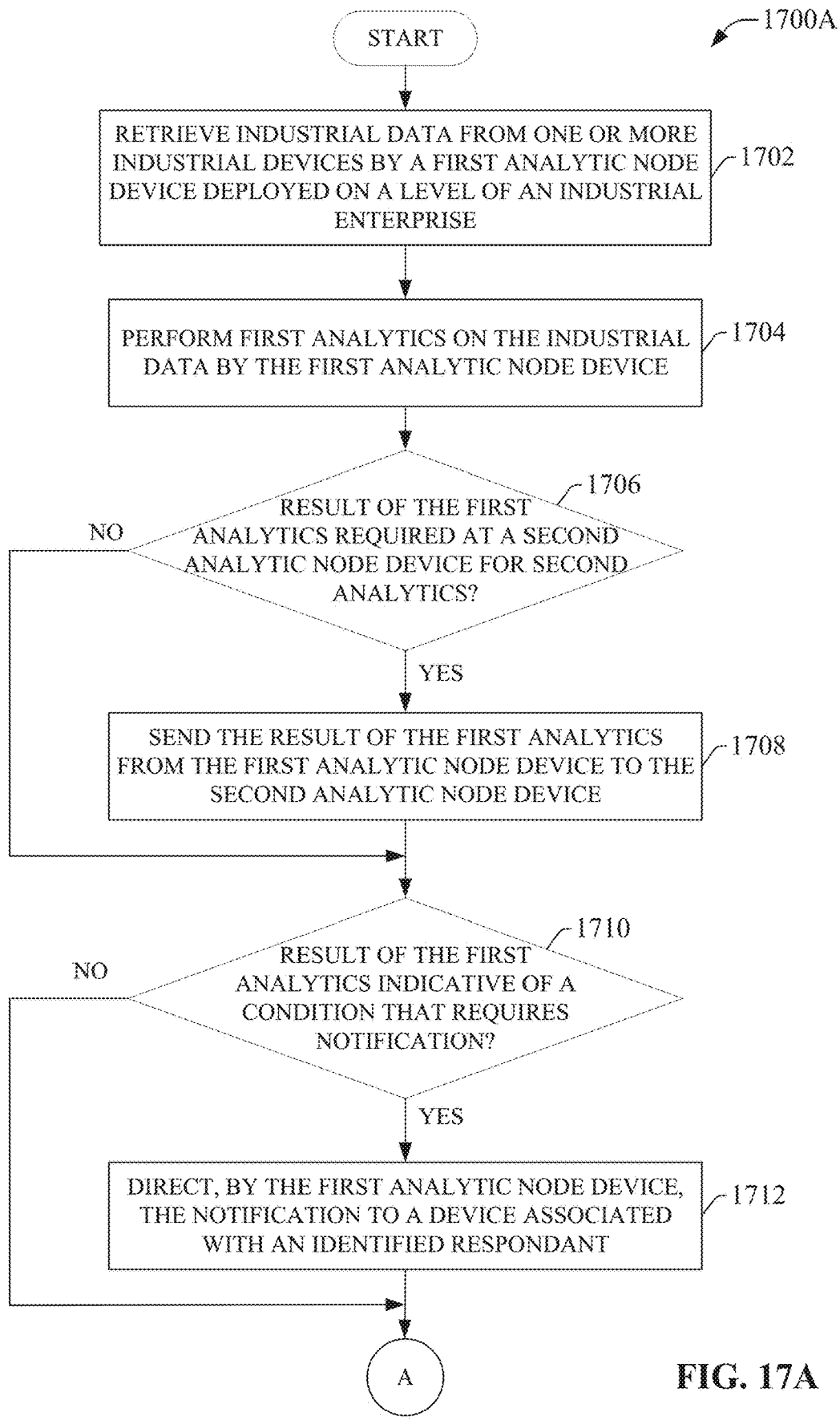
FIG. 17A is a flowchart of a first part of an example methodology for scaling analytics across analytic node devices deployed within an industrial environment.

FIGS. 16-17 illustrates methodologies in accordance with one or more embodiments of the subject application. While, for purposes of simplicity of explanation, the methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 16 illustrates an example methodology 1600 for configuring an analytic node for processing of industrial data. Initially, at 1602, one or more analytic elements are installed into an application framework of an analytic node. In some embodiments, the one or more analytics elements to be installed can be selected from an organized library of analytic elements defined in an analytic node configuration tool. This organized set can include analytic elements organized according to such categories as applicable industries (e.g., automotive, food and drug, packaging, etc.), types of industrial processes, or other such categories. At 1604, one or more data manipulation elements are installed into the application framework. At 1606, one or more data store elements are installed into the application framework. The application framework facilitates data exchange between the elements installed at steps 1602-1606, and allows multiple instances of each of the different element types to be installed and associated with the analytic node in order to satisfy the requirements of a given industrial analytics application.

At 1608, pre-processing of industrial data is performed by the analytic node in accordance with pre-processing instructions defined by the one or more data manipulation elements installed at step 1604 to yield pre-processed data. This pre-processing can include, but is not limited to, filtering, aggregation, or contextualization of the industrial data.

At 1610, one or more analytic operations are performed by the analytic node on the pre-processed data in accordance with the analytic instructions defined by the one or more analytic elements installed at 1602. The analytics operations can include, for example, simple rules-based operations, complex algorithms, pattern matching or recognition, AI analytics, or other such operations. At 1612, the analytic result can be stored at one or more data storage locations defined by the one or more data store elements installed at step 1608.

At 1614, at least a portion of the industrial data can be sent to another analytic node for further processing in response to a determination that the analytic result satisfies a defined criterion. For example, if the analytic node is executing on an industrial device that monitors and/or controls a plant-level machine or process, and the analytic result satisfies a criterion indicating that the result is relevant to a system-level process or device, the analytic node can send a relevant subset of the industrial data to an analytic node that executes on the system level.

Alternatively, if the analytic result does not require further processing by another analytic node, at least a portion of the data can be sent to another destination device, including but not limited to an HMI device, a client device associated with a specified user, or another system (e.g. a higher-level system such as an Enterprise Resource Planning system, a Machine Execution System, a reporting system, etc.).

FIG. 17 illustrates a first part of an example methodology 1700A for scaling analytics across analytic node devices deployed within an industrial environment. Initially, at 1702, industrial data is retrieved from one or more industrial devices by a first analytic node device deployed on a level of an industrial enterprise. The level may be, for example, a device level, a machine level, a system level, an enterprise level, etc. The first analytic node device may be a stand-alone analytic device having a wired or wireless network connection to the industrial devices, or may be integrated component of one of the industrial devices.

At 1704, first analytics is performed on the industrial data collected at step 1702 by the first analytic node device. The first analytics can be a simple rules-based analysis, or may be a more complicated algorithm that generates one or more analytic results using the industrial data as inputs or parameters. At 1706, a determination is made as to whether the result of the first analytics performed at step 1704 is required at a second analytic node device for second analytics to be performed at the second analytic node device. In an example scenario, the second analytic node device may reside on the same level as the first analytic node device. In such a scenario, the second analytic node device may be associated with another set of industrial devices (that is, a different set of industrial devices from those associated with the first analytic node device), and the first analytic node device may determine that the result of the first analytics is relevant to operation of the other set of industrial devices. In another example scenario, the second analytic node device may reside on a higher or lower level of the industrial enterprise relative to the analytic node device. For example, the second analytic node device may reside on a plant level of the industrial enterprise and execute analytics associated with higher level business aspects of the enterprise (e.g., inventory systems, accounting systems, ERP or MES systems, maintenance scheduling systems, etc.). In such scenarios, the first analytic node device may determine that the result of the first analytics is relevant to decision making carried out by the second analytic node in connection with those higher level systems.

If it is determined that the result of the first analytics is required at the second analytic node device (YES at step 1706), the methodology proceeds to step 1708, where the result of the first analytics is sent from the first analytic node device to the second analytic node device. Alternatively, if it is determined that the result of the first analytics is not required at the second analytic node device (NO at step 1706), the methodology proceeds to step 1710 without sending the result to the second analytic node device.

At step 1710, a determination is made as to whether the result of the first analytics performed at step 1704 is indicative of a condition that requires delivery of a notification to one or more human operators or external systems. If it is determined that the result is indicative of a condition that requires delivery of a notification (YES at step 1712), the methodology proceeds to step 1712, where the notification is directed, by the first analytic node device, to a device associated with an identified respondent (e.g., a client device associated with a human operator, a computing device on which a relevant external system executes, etc.). Alternatively, if the result of the first analytics is not indicative of a condition that requires delivery of a notification (NO at step 1710, the methodology proceeds to the second part of the methodology 1700B depicted in FIG. 17B without sending a notification.

Figure 17B:
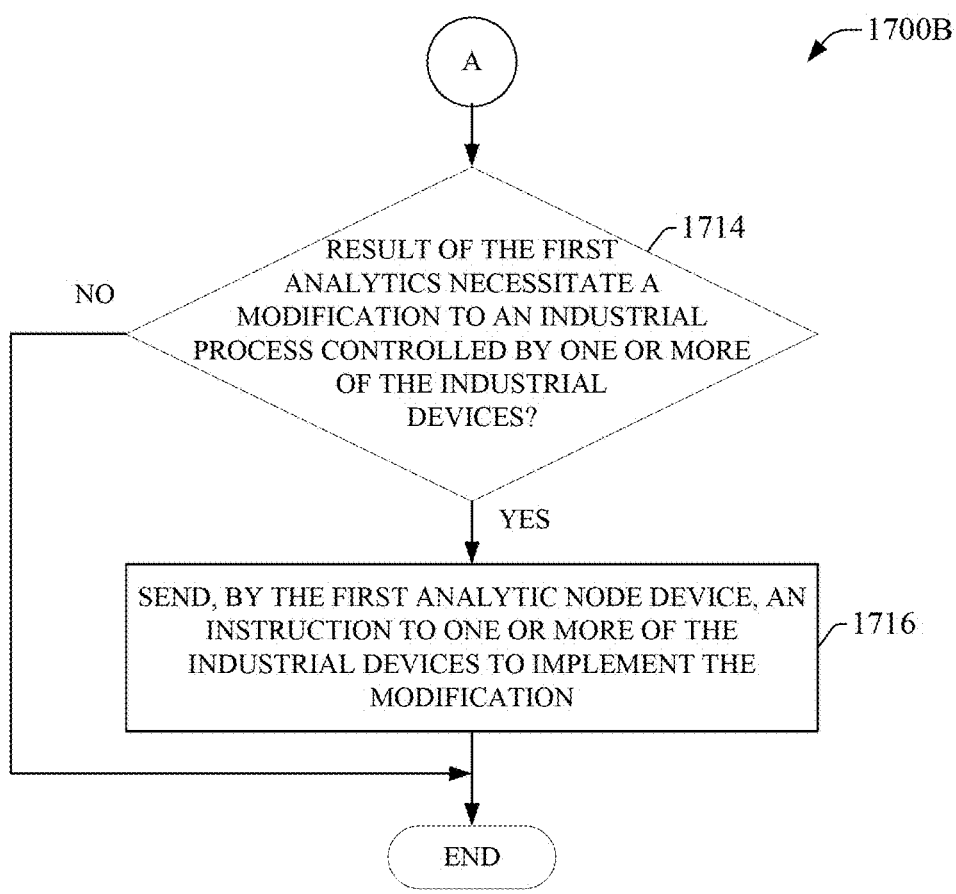
FIG. 17B is a flowchart of a second part of the example methodology for scaling analytics across analytic node devices deployed within an industrial environment.

FIG. 17B illustrates a second part of the example methodology 1700B for scaling analytics across analytic node devices deployed within an industrial environment. At 1714, a determination is made as to whether the result of the first analytics performed at step 1704 necessitates a modification to an industrial process controlled by one or more of the industrial devices. If it is determined that the result necessitates a modification to the industrial process (YES at step 1716), the methodology proceeds to step 1716, where the first analytic node device sends an instruction to one or more of the industrial devices to implement the modification. Alternatively, if the result does not necessitate the modification to the industrial process (NO at step 1714), the methodology ends without sending the instruction.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 18:
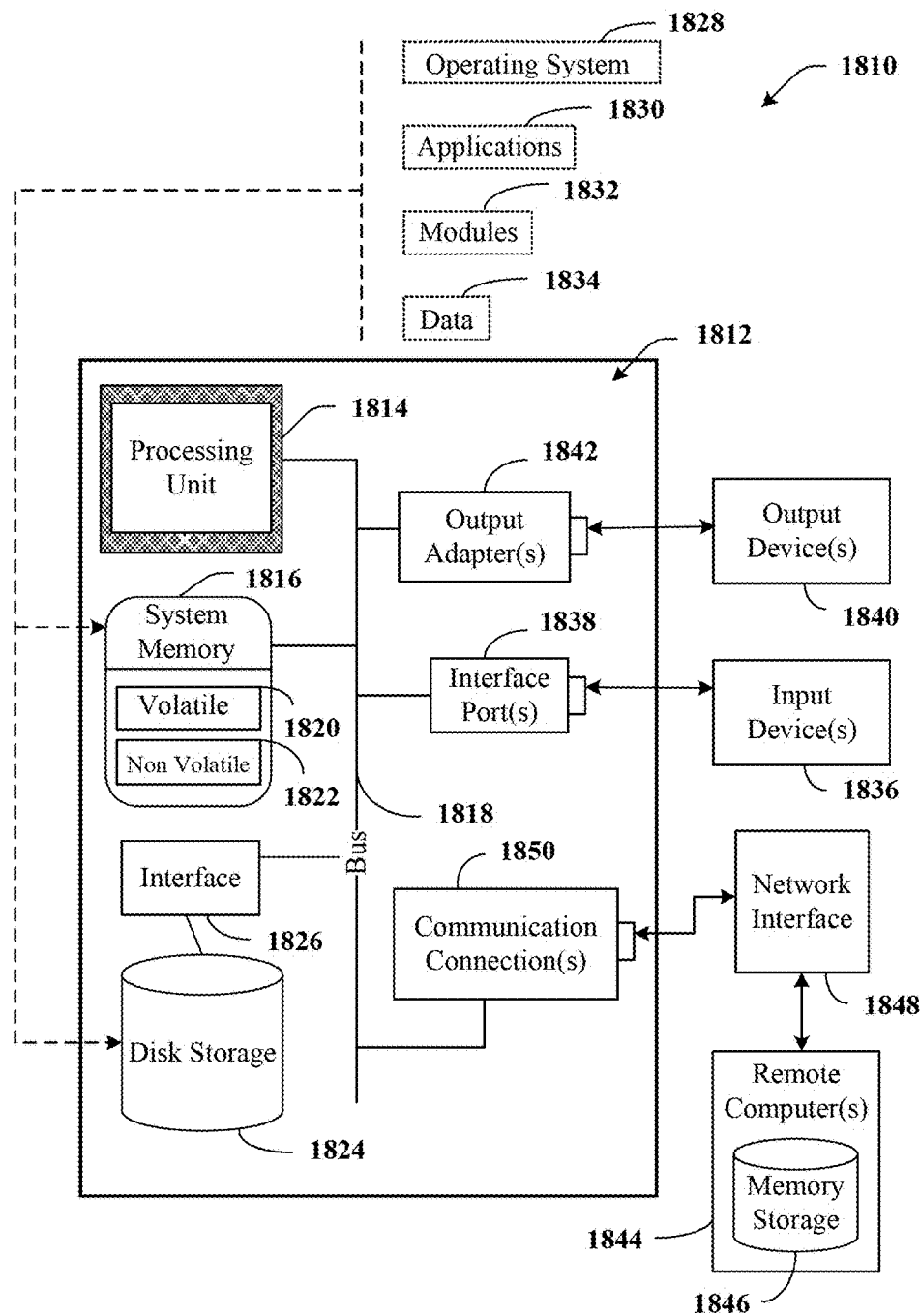
FIG. 18 is an example computing environment.
Figure 19:
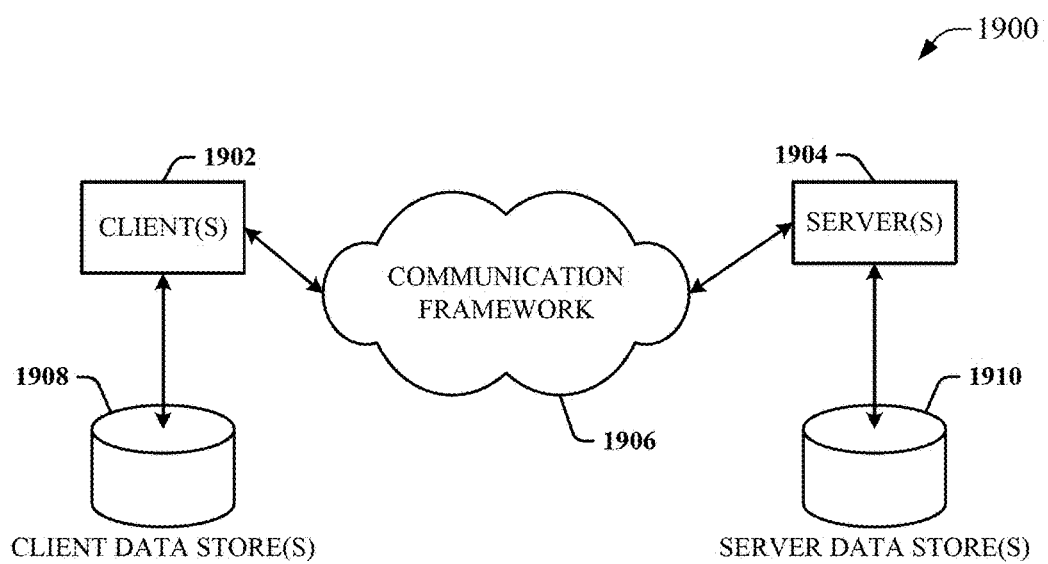
FIG. 19 is an example networking environment.

In order to provide a context for the various aspects of the disclosed subject matter, FIGS. 18 and 19 as well as the following discussion are intended to provide a brief, general description of a suitable environment in which the various aspects of the disclosed subject matter may be implemented.

With reference to FIG. 18, an example environment 1810 for implementing various aspects of the aforementioned subject matter includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Multi-core microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable PROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/nonvolatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1824 to the system bus 1818, a removable or non-removable interface is typically used such as interface 1826.

It is to be appreciated that FIG. 18 describes software that acts as an intermediary between users and the basic computer resources described in suitable operating environment

1810. Such software includes an operating system 1828. Operating system 1828, which can be stored on disk storage 1824, acts to control and allocate resources of the computer 1812. System applications 1830 take advantage of the management of resources by operating system 1828 through program modules 1832 and program data 1834 stored either in system memory 1816 or on disk storage 1824. It is to be appreciated that one or more embodiments of the subject disclosure can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapters 1842 are provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1848 can also encompass near field communication (NFC) or Bluetooth communication.

Communication connection(s) 1850 refers to the hardware/software employed to connect the network interface 1848 to the system bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

FIG. 19 is a schematic block diagram of a sample computing environment 1900 with which the disclosed subject matter can interact. The sample computing environment 1900 includes one or more client(s) 1902. The client(s) 1902 can be hardware and/or software (e.g., threads, processes, computing devices). The sample computing environment 1900 also includes one or more server(s) 1904. The server(s) 1904 can also be hardware and/or software (e.g., threads, processes, computing devices). The servers 1904 can house threads to perform transformations by employing one or more embodiments as described herein, for example. One possible communication between a client 1902 and servers 1904 can be in the form of a data packet adapted to be transmitted between two or more computer processes. The sample computing environment 1900 includes a communication framework 1906 that can be employed to facilitate communications between the client(s) 1902 and the server(s) 1904. The client(s) 1902 are operably connected to one or more client data store(s) 1908 that can be employed to store information local to the client(s) 1902. Similarly, the server(s) 1904 are operably connected to one or more server data store(s) 1910 that can be employed to store information local to the servers 1904.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering tech-

What is claimed is:

1. An analytic node device for processing industrial data, comprising:
a memory that stores executable components;
a processor, operatively coupled to the memory, that executes the executable components, the executable components comprising:
an analytic component configured to execute one or more analytic elements that perform respective one or more analytic operations on a set of industrial data obtained from a first host device on which the analytic node device executes;
a data manipulation component configured to execute one or more data manipulation elements that at least one of pre-process the set of industrial data prior to performance of the one or more analytic operations or post-process result data generated by the one or more analytic elements as a result of the performance of the one or more analytic operations;
a data store component configured to execute one or more data store elements that store at least one of the set of industrial data or the result data at respective one or more storage locations defined by the one or more data store elements; and
an application framework component configured to exchange at least a subset of the industrial data between the one or more analytic elements, the one or more data manipulation elements, and the one or more data store elements,
wherein
the application framework component is configured to allow modular addition and modular removal of one or more different analytic elements that define respective one or more different analytic operations, one or more different data manipulation elements that define respective different pre-processing or post-processing operations, and one or more different data storage elements that define respective one or more different storage locations,
an analytic profile data defines one or more conditions of the result data that, in response to the result data satisfying the one or more conditions, cause the analytic framework to send the result data to another analytic node device that executes on a second host device, and
the one or more conditions are indicative of a relevance of the result data to a system that includes the second host device.

2. The analytic node device of claim 1, wherein the first host device or the second host device is at least one of an industrial controller, a motor drive, an analytics card, an I/O module of an industrial controller, a cloud-based analytics system, a field gateway device, or an analytic computer.

3. The analytic node device of claim 1, wherein
the first host device is at least one of an industrial controller, a motor drive, an analytics card, an I/O module of an industrial controller, a cloud-based analytics system, a field gateway device, or an analytic computer, and
the second host device is a system-level device residing on a system layer of an industrial enterprise.

4. The analytic node device of claim 1, wherein the first host device operates on a system layer of an industrial enterprise, and the analytic node device receives at least a subset of the industrial data from one or more other analytic node devices that execute on at least one of an industrial controller, a motor drive, an analytics card, an I/O module of an industrial controller, a cloud-based analytics system, a field gateway device, or an analytic computer.

5. The analytic node device of claim 1, wherein the analytic profile data specifies one or more items of the industrial data to be collected, and the application framework component is configured to collect the one or more items of the industrial data for processing by at least one of the one or more analytic elements or the one or more data manipulation elements in accordance with the analytic profile data.

6. The analytic node device of claim 5, wherein the analytic profile data further defines at least one of
an identity of the other analytic node device to which the result data is to be sent, or
identities of which of the one or more analytic elements, the one or more data manipulation elements, or the one or more data storage elements are to process the one or more items of the industrial data, respectively.

7. The analytic node device of claim 1, further comprising a presentation framework component configured to send the result data to a thin client executing on at least one of a human-machine interface device, an industrial control program development application, or a mobile device.

8. The analytic node device of claim 1, wherein a data manipulation element of the one or more data manipulation elements is configured to at least one of filter the set of industrial data, aggregate the set of industrial data, or add contextual information to the set of industrial data.

9. The analytic node device of claim 1, wherein a data manipulation element of the one or more data manipulation elements is configured to add contextual information to the set of industrial data, the contextual information comprising at least one of a time at which the set of industrial data was generated or received by the analytic node device, a quality indicator, an identity of a plant or a production area within a plant from which the set of industrial data was received, a machine or process state at the time the set of industrial data was generated, or personnel identifiers that identify plant employees on shift at the time the set of industrial data was generated.

10. The analytic node device of claim 1, wherein the memory stores multiple sets of analytic profile data that define respective different subsets of the industrial data and that identify respective different sets of the one or more analytic elements, the one or more data manipulation elements, and the one or more data store elements to be applied to the respective different subsets of the industrial data.

11. A method, comprising:
performing, by an analytic node device comprising at least one processor, one or more pre-processing operations on industrial data obtained at least in part from a first host device on which the analytic node device executes to yield pre-processed industrial data, wherein the one or more pre-processing operations are defined by one or more modular data manipulation elements installed on the analytic node device;
performing, by the analytic node device, one or more analytic operations on the pre-processed industrial data to yield result data, wherein the one or more analytic operations are defined by respective one or more modular analytic elements installed on the analytic node device;

storing, by the analytic node device, at least one of a subset of the industrial data or the result data at one or more storage locations defined by respective one or more modular data store elements installed on the analytic node device;

in response to determining that the result data satisfies one or more conditions defined by analytic profile data indicative of a relevance of the result data to an industrial system associated with another analytic node device that executes on a second host device of the industrial system, sending, by the analytic node device, the result data to the other analytic node device; and exchanging, by the analytic node device, data between the one or more modular data manipulation elements, the one or more modular analytic elements, and the one or more modular data store elements via an application framework that facilitates modular addition and modular removal of the one or more modular data manipulation elements, the one or more modular analytic elements, and the one or more modular data store elements.

12. The method of claim 11, wherein
the first host device is at least one of an industrial controller, a motor drive, an analytics card, or an I/O module of an industrial controller, and
the second host device is a system-level device.

13. The method of claim 11, wherein the first host device resides on a first hierarchical layer of an industrial enterprise, and the method further comprises receiving a portion of the industrial data from a different analytic node device that executes on a second hierarchical layer of the industrial enterprise.

14. The method of claim 11, wherein the analytic profile data identifies a subset of the one or more analytic elements that are to perform the one or more analytic operations on the industrial data.

15. The method of claim 11, further comprising sending the result data to a thin client executing on at least one of a human-machine interface device, an industrial control program development application, or a mobile device.

16. The method of claim 11, wherein the performing the one or more pre-processing operations comprises at least one of filtering the industrial data, aggregating the industrial data, or adding contextual information to the industrial data.

17. A non-transitory computer-readable medium having stored thereon executable components that, in response to execution, cause an analytic node device comprising a processor to perform operations, the operations comprising:

performing one or more pre-processing operations on industrial data retrieved at least in part from a first host device on which the analytic node device executes to generate pre-processed industrial data, wherein the one or more pre-processing operations are defined by one or more modular data manipulation elements installed on the analytic node device;

performing one or more analytic operations on the pre-processed industrial data to generate result data, wherein the one or more analytic operations are defined by respective one or more modular analytic elements installed on the analytic node device;

storing at least one of a subset of the industrial data or the result data at one or more storage locations defined by respective one or more modular data store elements installed on the analytic node device;

in response to determining that the result data satisfies a criterion defined by analytic profile data indicative of a relevance of the result data to a system associated with another analytic node device, sending the result data to the other analytic node device; and exchanging data between the one or more modular data manipulation elements, the one or more modular analytic elements, and the one or more modular data store elements via an application framework that facilitates modular addition and modular removal of at least one of the one or more modular data manipulation elements, the one or more modular analytic elements, and the one or more modular data store elements.

18. The non-transitory computer-readable medium of claim 17, wherein the analytic profile data identifies a subset of the one or more analytic elements that are to perform the one or more analytic operations on the industrial data.

19. The non-transitory computer-readable medium of claim 17, the operations further comprising sending the result data to a thin client executing on at least one of a human-machine interface device, an industrial control program development application, or a mobile device.

20. The non-transitory computer-readable medium of claim 17, wherein the first host device on a first hierarchical layer of an industrial enterprise, and the operations further comprises receiving a portion of the industrial data from a different analytic node device that executes on a second hierarchical layer of the industrial enterprise.

* * * * *